United States Patent
Fujibayashi

(10) Patent No.: US 11,411,312 B2
(45) Date of Patent: Aug. 9, 2022

(54) PHASE ADJUSTING CIRCUIT AND PHASE ADJUSTING METHOD

(71) Applicant: Asahi Kasei Microdevices Corporation, Tokyo (JP)

(72) Inventor: Takeji Fujibayashi, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 259 days.

(21) Appl. No.: 16/882,763

(22) Filed: May 26, 2020

(65) Prior Publication Data

US 2020/0388917 A1 Dec. 10, 2020

(30) Foreign Application Priority Data

Jun. 7, 2019 (JP) .............................. JP2019-107045

(51) Int. Cl.
*H01Q 3/26* (2006.01)
(52) U.S. Cl.
CPC .................................. *H01Q 3/267* (2013.01)
(58) Field of Classification Search
CPC ...................................................... H01Q 3/267
See application file for complete search history.

(56) References Cited

U.S. PATENT DOCUMENTS

| | | | | |
|---|---|---|---|---|
| 4,373,160 A * | 2/1983 | Cooper | ..................... | H01Q 3/42 342/372 |
| 4,532,518 A * | 7/1985 | Gaglione | ................. | H01Q 3/36 333/17.1 |
| 6,046,697 A * | 4/2000 | Overbury | ................. | H01Q 3/36 342/174 |
| 7,110,794 B1 * | 9/2006 | Iinuma | ................. | H04B 7/0617 455/562.1 |

(Continued)

FOREIGN PATENT DOCUMENTS

WO WO-2016167253 A1 * 10/2016 ........... G01S 7/4008

OTHER PUBLICATIONS

Woorim Shin, et al., "60 GHz Active Phase Shifter using an Optimized Quadrature Al-Pass Network in 45nm CMOS." 2012 IEEE/MTT-S International Microwave Symposium Digest, Jun. 17-22, 2012, pp. 1-3.
Toshihiro Shimura, et al., "A Phase and Power Difference Detection Technique using Symmetric Mixer with Input Level Switching for Millimeter-wave Phased-Array Calibration." 2015 IEEE MTT-S International Microwave Symposium, May 17-22, 2015, pp. 1-4.
Baltasar Perez, et al., "360° Phase Detector Cell for Measurement Systems Based on Switched Dual Multipliers." IEEE Microwave and Wireless Components Letters, vol. 27, No. 5, May 2017, pp. 503-505.

*Primary Examiner* — Gregory C. Issing
(74) *Attorney, Agent, or Firm* — JCIPRNET

(57) ABSTRACT

A phase adjusting circuit is provided, including a signal generation circuit receiving a frequency adjusting signal and generating a reference signal having a frequency corresponding to the frequency adjusting signal; a first path receiving the reference signal and providing a first signal; a second path receiving the reference signal and providing a second signal, and time for the reference signal passing through the second path is different from time for the reference passing through the first path; a phase shifter disposed on the first path or the second path and shifting a phase of the reference signal based on a phase adjusting signal; a phase difference detection circuit detecting a phase difference between the first and the second signals; and an adjusting signal generation circuit generating the frequency adjusting signal and the phase adjusting signal based on the phase difference so that the phase difference becomes a target value.

12 Claims, 16 Drawing Sheets

(56) References Cited

U.S. PATENT DOCUMENTS 9,453,906 B2 9/2016 Floyd et al.
2015/0139352 A1* 5/2015 Matsuo .................. H04B 17/12
 375/295
2018/0003801 A1* 1/2018 Fujibayashi ............. H04B 7/10

* cited by examiner

PHASE ADJUSTING CIRCUIT AND PHASE ADJUSTING METHOD

CROSS REFERENCE TO RELATED APPLICATIONS

This application claims the priority benefit of Japanese Patent Application No. 2019-107045, filed on Jun. 7, 2019. The entirety of the above-mentioned patent application is hereby incorporated by reference herein and made a part of this specification.

TECHNICAL FIELD

The present disclosure relates to a phase adjustment circuit and a phase adjustment method for adjusting a phase difference between signals to a target phase difference.

RELATED ART

In wireless communication, there is a technique of controlling the emission direction of a transmission wave radiated from an antenna. Such a technique is called beamforming. In the beamforming technology, a plurality of antennas is used, and the transmission carriers with appropriately different phases and powers are emitted from the respective antennas. As a result, since the radio waves have the same phase in a specific direction are intensified each other, and in other specific directions the radio waves are cancelled each other by having opposite phases, the transmission radio waves are concentrated and emitted in the specific direction, or, on the contrary, it is possible to prevent the transmission radio waves from being emitted in a specific direction. Here, the process using the beamforming technology on the transmission side of the radio wave will be described, but similarly, the side that receives radio waves also strongly receives radio waves in the specific direction with the beamforming technology, or it is possible not to receive radio waves in a specific direction.

To realize the beamforming, it is necessary to properly select and control the phase state of the transmission carrier supplied to each antenna.

In recent years, a transmission system has been proposed in which a transmission circuit connected to an antenna includes a phase shifter, the phase amount in the phase shifter is dynamically changed with time, and the beam emission direction is dynamically changed. As described above, in the transmission system that dynamically switches the emission direction of the beam, it is required to appropriately select the phase of the transmission carrier provided to each antenna and control the state thereof. However, in the case of a system using a high frequency signal of several tens GHz such as a vehicle-mounted millimeter wave radar as the transmission carrier, it is very difficult to control the phase state with high accuracy.

In other words, as a phase shifter, for example, Non-Patent Document 1 (60 GHz Active Phase Shifter using an Optimized Quadrature All-Pass Network in 45 nm CMOS, Worim Shin, Gabriel M. rebeiz, 978-1-4673-1088-8/, (c)2012 IEEE) proposes a circuit. However, for communication systems that use high frequencies, in the known phase shifter described in Non-Patent Document 1, it is known that the phase of a transmission wave transmitted from a plurality of antennas has an error of about 10 degrees. It is also possible to measure and correct such an error in advance, but the phase error varies depending on the temperature and the like. If the phase error is corrected in consideration of the temperature and the like, it is considered that the correction process becomes very complicated.

In addition, in the on-vehicle radar, it is necessary to correct the emission direction of the transmission wave by changing the longitudinal inclination angle of the vehicle. That is, the angle of the chassis of the vehicle changes depending on the weight of the rear cargo bed and the like. In the beamforming technology, it is necessary to correct the deviation of the emission direction of the transmission wave before and after the change of the chassis angle and keep the emission direction horizontal. In such a case, it is necessary to control the emission direction of the transmission waves with an accuracy of several degrees. Also, at this time, the phase of the transmission waves needs to be adjusted with an accuracy of several degrees depending on the arrangement of the antenna. In this way, it is difficult to realize a phase adjusting circuit having a high absolute value accuracy.

Therefore, in order to control the phase with high accuracy, a method has been proposed in which the phase is monitored using a phase difference detection circuit and controlled to an arbitrary phase (for example, refer to Non-Patent Document 2 (A Phase and Power Difference Detection Technique using Symmetric Mixer with Input Level Switching for Millimeter-wave Phased-Array Calibration, Toshihiro Shimura, Yoji Ohashi, Takenori Ohshima, 978-1-4799-8275-2/15/, (c) 2015 IEEE)). For example, the transmitter 100 shown in FIG. 15 has one signal source 101, and the local signal generated by the signal source 101 is provided to each of the two transmission circuits 102. The local signal received by transmission circuit 102 is phase-shifted by the phase shifter 102a, amplified by the power amplifier 102b, and then transmitted from the antenna 105 as a transmission signal via the distributor 102c. The distribution signal S101 of the transmission signal of each transmission circuit 102, which is distributed by the distributor 102c, is provided to the phase difference detection circuit 103. The output of the phase difference detection circuit 103 is, if necessary, subject to an AD conversion by the A/D and arithmetic circuit 104, and then based on the phase difference of each distribution signal S101, the phase adjusting signal S102 for controlling the phase amount of each phase shifter 102a is provided to the phase shifter 102a. In this way, the phase difference of the transmission signal transmitted from each transmission circuit 102 is adjusted. That is, in the phase difference detection circuit 103, the phase difference of the distribution signal S101 from each transmission circuit 102 is detected so that an appropriate phase relationship is obtained, and by adjusting the phase amount of each phase shifter 102a, the phase difference of the transmission signal transmitted from each transmission circuit 102 is adjusted to the appropriate phase relationship.

FIG. 16 shows a schematic configuration of the phase difference detection circuit 103. In the phase difference detection circuit 103, the two distribution signals S101a, S101b are multiplied by using the mixer circuit 103a to obtain a DC voltage corresponding to the phase difference between the two distribution signals S101a, S101b from each of the two transmission circuits 102, and the DC voltage is provided as a signal A corresponding to the phase difference. The A/D and calculation circuit 104 estimates the phase difference from the DC voltage.

That is, if f is set as the frequency of each of the distribution signals S101a, S101b, one distribution signal S101a is sin $(2\pi ft+\theta A)$, and the other distribution signal S101b is sin $(2\pi ft+\theta B)$ and $\theta=\theta A-\theta B$, the output A of the mixer circuit 103a can be expressed by the following equation (1) and can be expressed as a function of the phase difference θ. In addition, the conversion gain of the mixer circuit 103a is K.

$$A=(K/2)\cos(\theta) \quad (1)$$

Here, the response of the phase difference detection circuit 103 using the mixer circuit 103a is generally represented by a function of sine or cosine.

FIG. 17 is a characteristic diagram showing the relationship between the phase difference θ when the conversion gain K of the mixer circuit 103a is K=2 and the output A of the mixer circuit 103a, that is, the DC output voltage.

Here, by sweeping the local signal with the phase shifter 102a, the peak voltage Vp of the local signal is measured, and the phase difference detection circuit 103 will search for a phase difference equal to the voltage of Vp/(√2) in a case for realizing a phase difference of 45° for example. In the method of searching for the phase difference by such a process, it is possible to realize the phase difference of 45°, 90°, etc. However, for example, when trying to realize a phase difference near 0° or 180°, since the output voltage of the phase difference detection circuit 103 is almost no change in the vicinity of 0°, the error of measuring voltage due to the influence of minute noise or the like may greatly affects the phase difference obtained from the phase difference detection circuit 103. Therefore, when the phase states of the two phase shifters 102a are specific phase state such as 0° or 180°, the phase difference detection circuit 103 has a problem that the measurement accuracy of the phase difference is low.

Therefore, in Non-Patent Document 2, the phase difference detection circuit 201 as shown in FIG. 18 is configured to increase the measurement accuracy. That is, the phase difference detection circuit 201 comprises two phase delay circuits 211 and 212 and two mixer circuits 213 and 214.

Then, one distribution signal S101a and the distribution signal S101b whose phase is shifted by φB by the phase delay circuit 212 are provided to the mixer circuit 213 having a conversion gain of KA, and both of the distribution signals S101a, S101b are multiplied to obtain an output A. Although not explicitly shown in Non-Patent Document 2, the high frequency component is removed from the multiplication result obtained by the mixer circuit 213, and the output A contains the DC component only.

At the same time, the distribution signal S101b and the distribution signal S101a whose phase is shifted by φA by the phase delay circuit 211 are provided to the mixer circuit 214 having a conversion gain of KB to obtain an output B of multiplication result. Similar to the output A, the output B also contains only a DC component in which a high frequency component is removed.

If f is the frequencies of the distribution signals S101a, S101b, the distribution signal S101a is sin (2πft+θA), the distribution signal S101b is sin (2πft+θB), and θ=θA−θB, the output A of the mixer circuit 213 can be expressed by the following equation (2), the output B of the mixer circuit 214 can be expressed by the following equation (3), which are expressed as a function of the phase difference θ.

$$A=(KA/2)\cos(\theta-\varphi B) \quad (2)$$

$$B=(KB/2)\cos(\theta-\varphi A) \quad (3)$$

In Non-Patent Document 2, in order to avoid the sensitivity deterioration at the extreme value, the phases are intentionally shifted by the phase delay amounts φA and φB, and A+B and A−B with respect to the outputs A and B of the mixer circuits 213 and 214 are calculated. When A+B and A−B are calculated, A+B and A−B can be expressed by the following equations (4) and (5).

$$A+B=((KA\cos(\varphi B)+KB\cos(\varphi A))/2)\cos\theta+((KB\sin(\varphi A)-KA\sin(\varphi B))/2)\sin\theta \quad (4)$$

$$A-B=((KA\cos(\varphi B)-KB\cos(\varphi A))/2)\cos\theta+((KB\sin(\varphi A)+KA\sin(\varphi B))/2)\sin\theta \quad (5)$$

Here, the conversion gain KA of the mixer circuit 213 and the conversion gain KB of the mixer circuit 214 are equal to each other. When the phase delay amount φA of the phase delay circuit 211 and the phase delay amount φB of the phase delay circuit 212 are equal, equations (4) and (5) are represented by the following equations (6) and (7), which are simple functions of cos θ and sin θ respectively.

$$A+B=(KA\cos(\varphi A))\cos\theta \quad (6)$$

$$A-B=(KA\sin(\varphi A))\sin\theta \quad (7)$$

When the functions represented by the equations (6) and (7) are plotted, the functions can be represented by the characteristic lines L1 and L2 shown in FIG. 19. In addition, FIG. 19 shows the characteristics when φA=φB=30°.

As shown in FIG. 19, in the case of A+B (L1), the phase difference takes extreme values at 0° and 180° (−180°). In the case of A−B (L2), the extreme values are taken at 90° and −90°. The non-patent document 2 utilizes the fact that A+B and A−B have relationship of sine and cosine respectively, and the phase is calculated from the value of A−B in the vicinity of 0° and 180° and the phase is calculated from the value of A+B in the vicinity of −90° and 90°. Thereby, the phase detection that avoids the sensitivity deterioration near the extreme values can be realized.

However, the method of calculating the phase based on the outputs A and B of the above two mixer circuits 213 and 214 has the following issues.

First, two mixer circuits with the same gain are required. That the gains of the mixer circuit 213 and the mixer circuit 214 are consistent is expected, but if the gains deviate by about 0.3 dB, a detection error of about 1° will occur. Therefore, mixer circuits in which conversion gains are aligned with high accuracy is required, and it is a constraint in realizing the high accuracy phase detection.

Secondly, the phase delay amounts of the phase delay circuits 211 and 212 need to be the same. When the phase delay amounts of the phase delay circuit 211 and the phase delay circuit 212 differ by 2°, a detection error of about 1° occurs. Therefore, the phase delay circuits whose characteristics are consistent with each other with high accuracy is required, which is also a constraint for realizing the high accuracy phase detection. Moreover, since two mixer circuits and two phase delay circuits are required, the circuit scale increases.

Third, for example, as in the phase detection utilizing the distortion response characteristic used in Patent Document 1 (U.S. Pat. No. 9,453,906), if the frequencies of the two signals to be compared have the relationship of 1:2 for example, the point is that the method of detecting the phase based on the outputs A and B of the mixer circuits 213 and 214 cannot be applied. That is, in the phase detection method used in Non-Patent Document 2, theoretically, it is a necessary condition that the frequencies of two signals to be compared are the same.

SUMMARY

The present disclosure provides a phase adjusting circuit and a phase adjusting method capable of improving accuracy with a simple circuit configuration without increasing the circuit scale.

According to one embodiment of the present disclosure, a phase adjusting circuit is provided. The phase adjusting circuit includes a signal generation circuit, a first path, a second path, phase shifter, a phase difference detection circuit and an adjusting signal generation circuit. The signal generation circuit receives a frequency adjusting signal and generates a reference signal having a frequency corresponding to the frequency adjusting signal. The first path receives the reference signal and provides a first signal. The second path receives the reference signal and provides a second signal, and a time for the reference signal to pass through the second path is different from a time for the reference passing through the first path. The phase shifter is disposed on either one of the first path and the second path and shifts a phase of the reference signal based on a phase adjusting signal. The phase difference detection circuit detects a phase difference between the first signal and the second signal. The adjusting signal generation circuit generates the frequency adjusting signal and the phase adjusting signal based on the phase difference so that the phase difference becomes a target value.

According to another embodiment of the present disclosure, a phase adjusting method is provided. The method includes: providing a time difference between two paths; providing a reference signal to the two paths and setting a phase difference between the two paths; and adjusting the phase difference and a frequency of the reference signal based on the phase difference so that the phase difference becomes a target value.

Accordingly, it is possible to increase the accuracy of phase adjustment with a simple circuit configuration without increasing the size of the circuit.

DESCRIPTION OF THE EMBODIMENTS

Figure 1:
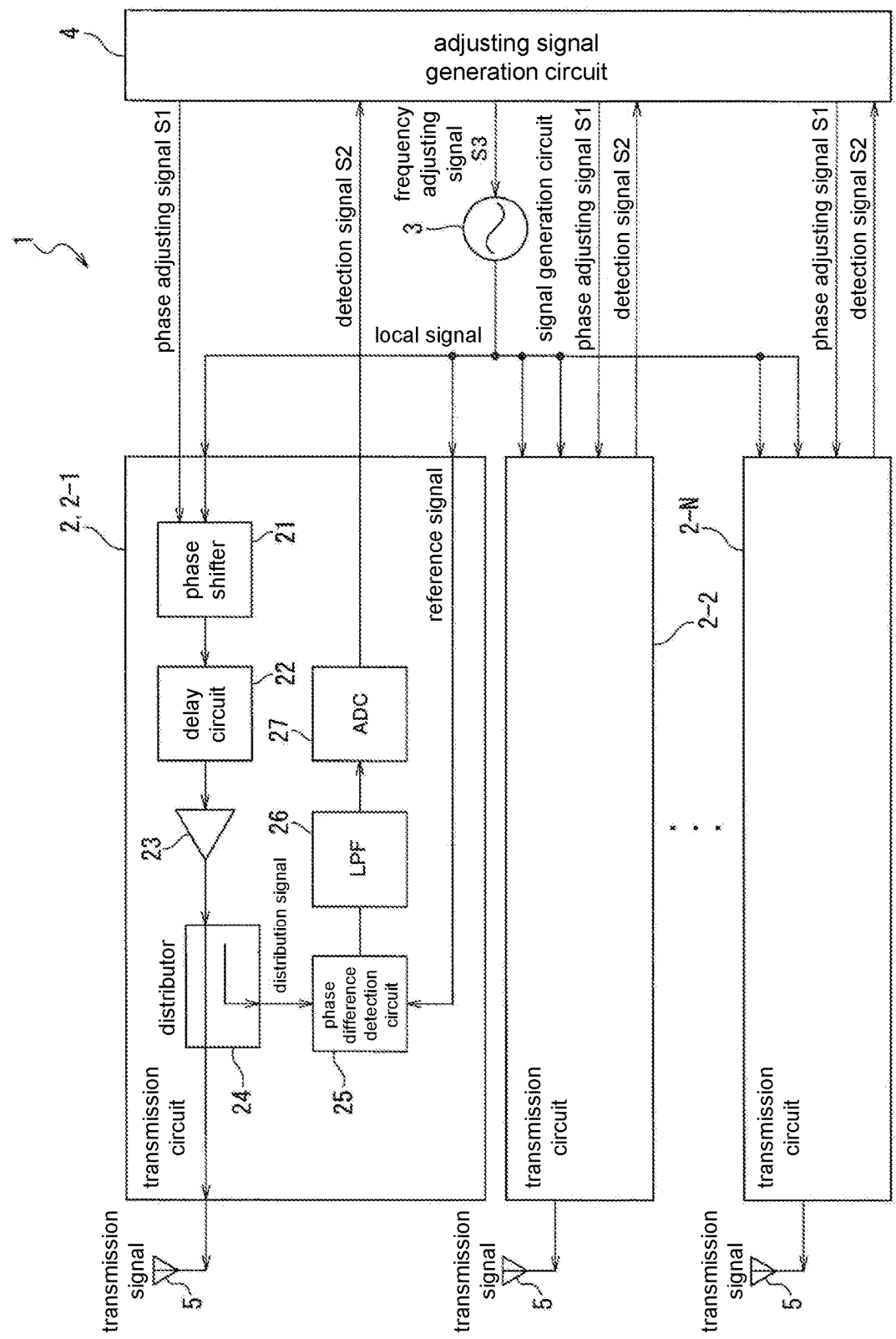
FIG. 1 is a schematic configuration diagram showing an example of a transmitter to which a phase adjusting circuit according to an embodiment of the present disclosure is applied.

In the following detailed description, numerous specific configurations are set forth in order to provide a thorough understanding of the embodiments of the disclosure. However, it is obvious that other embodiments can be implemented without being limited to such a specific configuration. In addition, the following embodiments do not limit the disclosure according to the claims, and include all combinations of characteristic configurations described in the embodiments.

An embodiment of the present disclosure will be described below with reference to the drawings. In the following description of the drawings, the same parts are designated by the same reference numerals. However, the drawings are schematic, and the relationship between the thickness and the plane dimension, the thickness ratio of each layer, and the like are different from the actual ones.

First Embodiment

First, the first embodiment will be described. FIG. 1 is a schematic configuration diagram showing an example of a transmitter 1 to which a phase adjusting circuit according to an embodiment of the present invention may be applied.

The transmitter 1 comprises N transmission circuits 2 (2-1, 2-2, . . . , 2-N, N is and positive integer) having the same configuration, one signal generation circuit 3, an adjusting signal generation circuit (arithmetic part) 4 for calculating a phase amount in each transmission circuit 2 and controlling a frequency of the signal generation circuit 3, and an antenna 5. The signal generating circuit 3 is configured to be able to adjust frequency, and change the frequency of a local signal to be generated so as to have the frequency specified by the frequency adjusting signal S3 from the adjusting signal generating circuit 4. That is, the signal generation circuit 3 receives a frequency adjusting signal S3 and generates a reference signal having a frequency corresponding to the frequency adjusting signal S3.

The transmission circuit 2 comprises a phase shifter 21 and a delay circuit 22, an amplifier 23, a distributor 24, a phase difference detection circuit 25, a low pass filter (LPF) 26, and an AD converter (ADC) 27, and an output of the transmission circuit 2 is transmitted from the antenna 5 as a transmission signal.

The phase shifter 21 receives a phase adjusting signal S1 from the adjusting signal generation circuit 4 and shifts a phase of a local signal with a predetermined frequency provided from the signal generation circuit 3 by a phase amount specified by the phase adjusting signal S1.

The delay circuit 22 delays the phase-adjusted local signal by a predetermined time. The local signal delayed by the delay circuit 22 is provided to the distributor 24 via the amplifier 23.

The distributor 24 provides the input signal to the antenna 5 as a transmission signal, and to the phase difference detection circuit 25 as a distribution signal.

The phase difference detection circuit 25 is configured by, for example, a mixer circuit, and receives the distribution signal divided by the distributor 24, i.e., the transmission signal. At the same time, a local signal generated by the signal generation source 3 is provided to the phase difference detection circuit 25 as a reference signal. The phase difference detection circuit 25 multiplies the distribution signal and the reference signal, and provides the multiplication result to an LPF (low-pass filter) 26 as a phase difference signal that is a function of the phase difference θ between the distribution signal and the reference signal.

The phase difference signal in which the high frequency component has been removed by the LPF 26 is converted to a digital signal by the ADC (AD converter) 27, and then, as a detection signal S2 formed of a DC signal that is a function of the phase difference θ between the distribution signal and the reference signal, is provided to the adjustment signal generation circuit 4.

When the gain of the phase difference detection circuit 25 is K and the phase difference between the distribution signal and the reference signal is θ, the output of the LPF 26 is represented by K·cos θ.

Here, a path where the local signal is transmitted through the phase shifter 21, the delay circuit 22, the amplifier 23, and the distributor 24 to the phase difference detection circuit 25 as the distribution signal (first generation signal) corresponds to the first path described in the claims, and a path where the local signal is transmitted to the phase difference detection circuit 25 as the reference signal (second generation signal) corresponds to the second path described in the claims. Further, the transmission circuit 2, the signal generation source 3, and the adjusting signal generation circuit 4 correspond to the phase adjusting circuit described in the claims. The first path receives the reference signal and provides the first signal. The second path receives the reference signal and provides the second signal, and the time for the reference signal passing through the second path is different from the time for the reference signal passing through the first path. The phase difference detection circuit 25 detects the phase difference between the first signal that is the distribution signal and the second signal that is the reference signal.

The adjusting signal generation circuit 4 generates a phase adjusting signal S1 for making the phase difference between the distribution signal and the reference signal a predetermined phase difference based on the detection signal S2 at a preset timing, and provides the detection signal S2 to the phase shifter 21. The adjusting signal generation circuit 4 also generates a frequency adjusting signal S3 for controlling the frequency of the local signal to a predetermined frequency, and provides the frequency adjustment signal S3 to the signal generation circuit 3. The adjusting signal generation circuit 4 controls the phase of the local signal of each transmission circuit 2 so as to have an arbitrary phase difference with respect to the reference signal. In this manner, the phase differences between the transmission carriers are controlled. Further, the adjusting signal generation circuit 4 controls the generation frequency of the signal generation circuit 3 based on the predetermined transmission data, and transmits the predetermined transmission data via the transmission circuit 2 by the frequency modulation method after the phase adjustment. As a result, predetermined transmission data is transmitted by the beam forming method. That is, the adjusting signal generation circuit 4 generates the frequency adjusting signal S3 and the phase adjusting signal S1 based on the phase difference so that the phase difference becomes the target value.

The delay amount of the delay circuit 22 is adjusted, for example, by the number of cascade connection stages of the buffer circuits and uses the passing delay of a sufficient phase high frequency buffer circuit with respect to a frequency range in which the signal generation circuit 3 is able to change. Alternatively, for example, the delay amount can be set by adjusting the connection wire length and using the delay caused by the wire length in the connection between the circuits.

The delay circuit 22 may be provided on the input side of the phase shifter 21 or may be provided on the output side of the amplifier 23. That is, the timing of delaying the local signal may be after the phase is adjusted by the phase shifter 21 as shown in FIG. 1, before being provided to the phase shifter 21, or after being amplified by the amplifier 23. Further, the phase shifter 21 and the amplifier 23 usually have a passing delay in the circuit itself. Therefore, the delay circuit 22 may be not prepared separatedly, and the circuit having each function included in the transmission circuit 2 such as the phase shifter 21 and the amplifier 23 may also have the function of the delay circuit.

Figure 2:
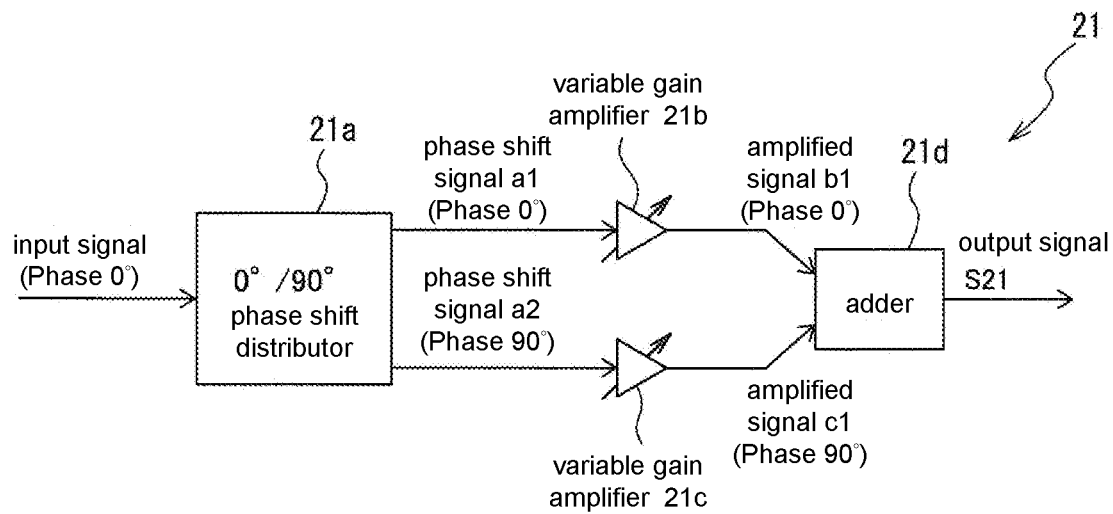
FIG. 2 is a configuration diagram showing an example of a phase shifter.

The phase shifter 21 may be configured by a general phase shifter in a high frequency circuit. FIG. 2 shows an example. The configuration of the phase shifter 21 is not limited to the configuration shown in FIG. 2, and any circuit configuration may be used as long as the phase amount can be adjusted according to the phase adjusting signal S1.

The phase shifter 21 is arranged on one of the first path and the second path, and shifts the phase of the reference signal based on the phase adjusting signal S1.

As shown in FIG. 2, the phase shifter 21 includes a phase shift divider 21a, variable gain amplifiers 21b and 21c whose gain can be adjusted according to a control signal from the outside, and an adder 21d.

The phase shift distributor 21a distributes the received local signal formed of a high frequency signal into a phase shift signal a1 indicating a phase of 0° and a phase shift signal a2 indicating a phase of 90°, and the phase shift signal a1 is provided to the variable gain amplifier 21b and the phase shift signal a2 is provided to the variable gain amplifier 21c.

The variable gain amplifiers 21b and 21c amplify the phase shift signals a1 and a2 with the adjusted gains respectively, and generate the amplified signal b1 and the amplified signal c1 to the adder 21d.

Here, the variable gain amplifiers 21b and 21c are configured such that not only the gain can be increased or decreased, but also the negative gain, that is, the polarity of the signal can be reversed.

The adder 21d adds the amplified signal b1 and the amplified signal c1 and provides the addition result as an output signal S21 of the phase shifter 21.

Next, the principle of changing the phase in the phase shifter 21 having the configuration shown in FIG. 2 will be described with reference to FIG. 3.

The phase shift signals a1 and a2 have a phase difference of 90° with each other. Therefore, as shown by arrows m1 and m2 in FIG. 3, the phase shift signals a1 and a2 may be expressed by vectors having substantially the same amplitude (absolute value) and different elevation angles of 90°.

Figure 3:
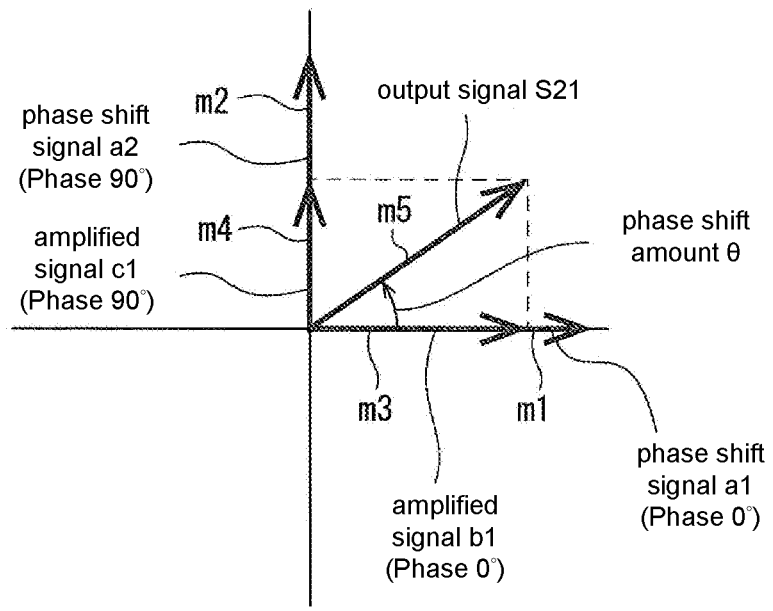
FIG. 3 is an explanatory diagram for explaining the operation of the phase shifter.

The amplified signals b1 and c1 are as shown by arrows m3 and m4 in FIG. 3, and can be expressed by vectors whose phases are the same as those of the phase shift signals a1 and a2, but whose amplitudes are different. The sum of the two vector components m3 and m4 by the adder 21d becomes the output signal S21 of the phase shifter 21. Therefore, the output signal S21 of the phase shifter 21 is represented by a vector having a phase and an amplitude as shown by an arrow m5. That is, the output signal S21 is generated at a phase different from the phase of the phase shift signal m1, that is, the phase of the input signal (that is, the local signal) by the phase $\theta$, and the phase is changed by $\theta$.

Further, by properly selecting the gains of the variable gain amplifiers 21b and 21c, the phase of the output signal S21 of the phase shifter 21 can be selected from any phase from 0° to 360°. This is the principle of the phase shifter 21. That is, since the phase shifter 21 has a principle of determining the phase change amount $\theta$ by compositing two vectors, the phase shifter 21 is characterized in that the phase change amount of the output signal with respect to the phase of the input signal is substantially constant even though the frequency of the input signal changes slightly.

Figure 4:
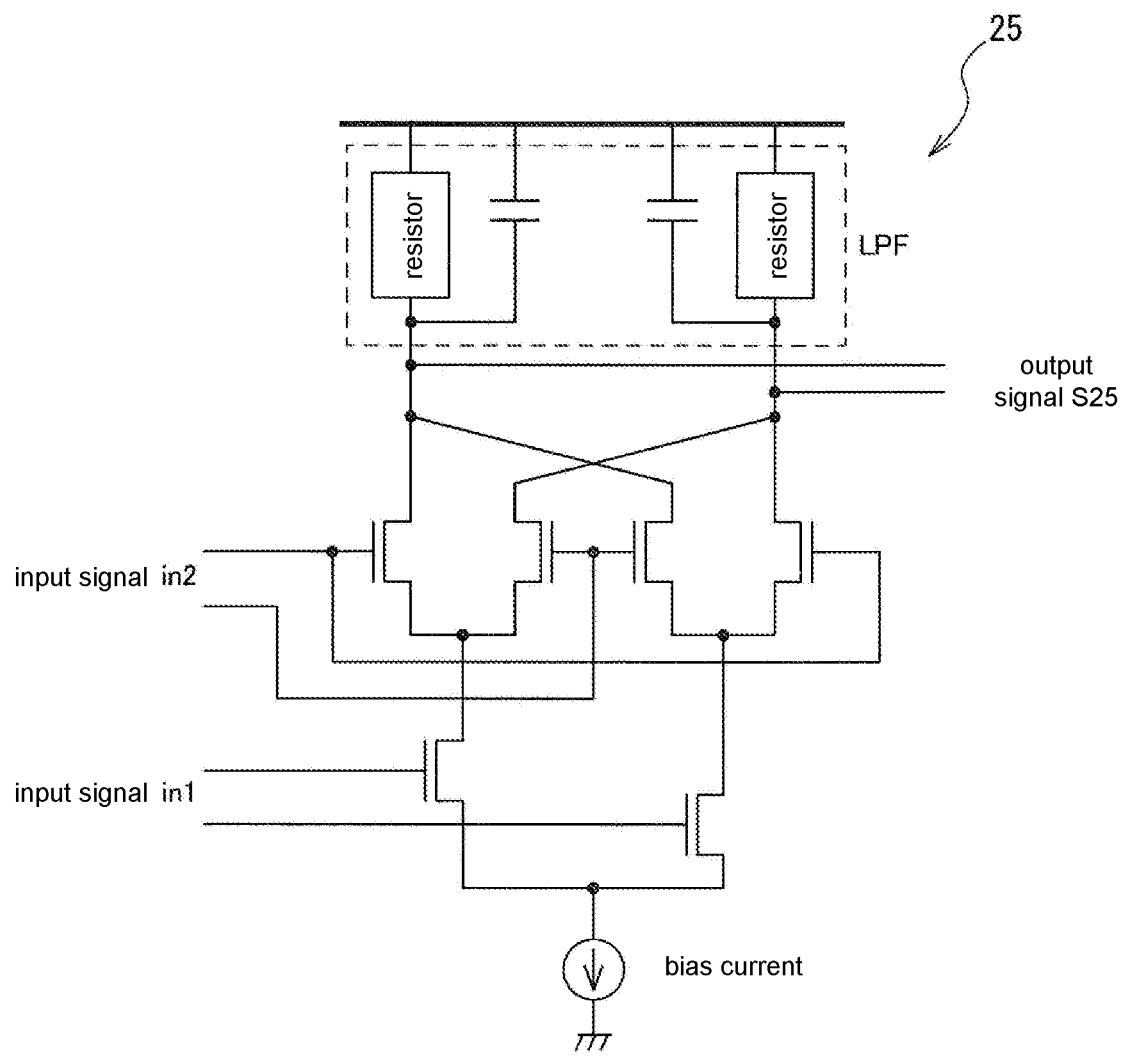
FIG. 4 is a configuration diagram showing an example of a phase difference detection circuit.

Returning to FIG. 1, the phase difference detection circuit 25 is configured by a phase difference detection circuit using a mixer circuit. FIG. 4 shows an example. The configuration of the phase difference detection circuit 25 is not limited to the configuration shown in FIG. 4, and any circuit configuration may be used as long as it can provide a signal according to the phase difference between the distribution signal and the reference signal.

As shown in FIG. 4, the phase difference detection circuit 25 is configured by a mixer circuit with a configuration that differential amplifier circuits are vertically stacked and is generally called a Gilbert cell. That is, a component obtained by multiplying the input signal in1 (distribution signal) and the input signal in2 (reference signal) is presented as the signal output S25. In FIG. 4, the resistors and the capacitors provided in the signal output part functions as a role of LPF, and what actually presents as the signal output S25 is a component of a frequency equal to the difference between the frequencies of the signal input in1 and the signal input in2. That is, if the input signal in1 and the input signal in2 have the same frequency, a DC voltage corresponding to the phase difference between the input signal in1 and the input signal in2 is presented as the signal output S25.

Next, in the phase difference detection circuit 25 having the configuration shown in FIG. 4, a procedure for adjusting the phase difference between the distributed signal and the reference signal to be in a phase state near the extreme value of the output characteristic of the phase difference detection circuit 25, that is, near 0° and 180° will be described.

Figure 5:
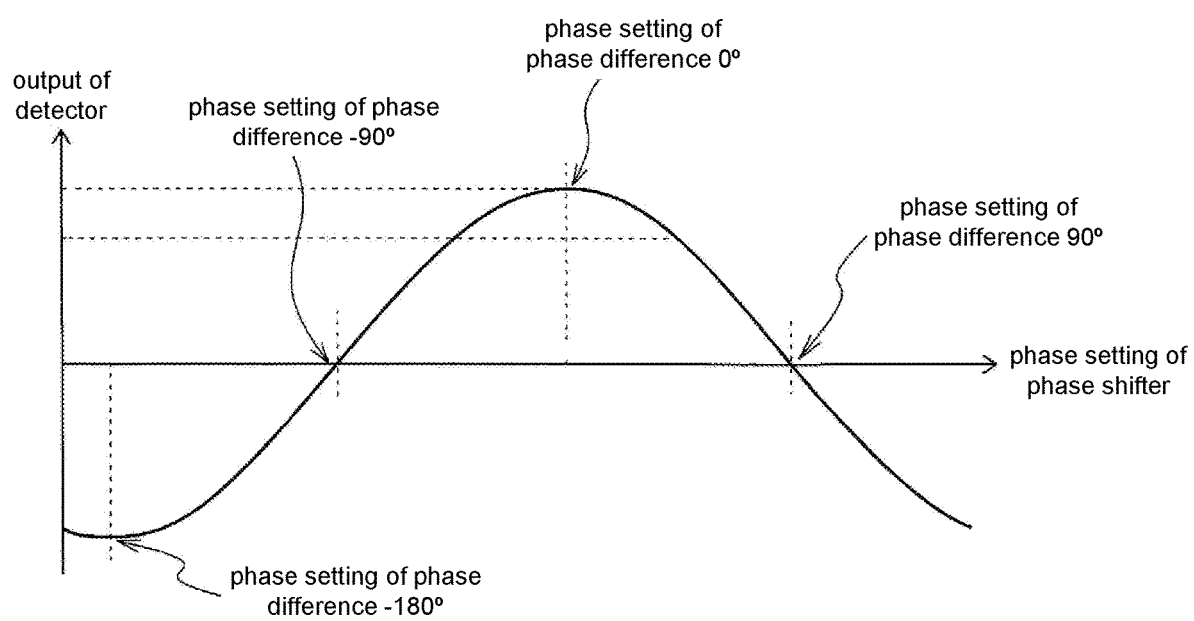
FIG. 5 is a characteristic diagram showing correspondence between a phase shifter and a phase difference detection circuit.

FIG. 5 is a plot of the output S25 of the phase difference detection circuit 25 with respect to the phase setting (phase change amount $\theta$) of the phase shifter 21. Since the output S25 of the phase difference detection circuit 25 is a function of cos $\theta$, the phase difference becomes 0° with the phase setting of taking a positive extreme value, and the phase difference becomes –180°, that is, 180° with the phase setting of taking a negative extreme value. Further, the phase difference becomes 90° with the phase setting of the zero cross point having a negative slope, and the phase difference becomes –90° with the phase setting of the zero cross point having a positive slope. When searching for a phase setting that realizes an arbitrary phase difference, for example, when the phase difference is 90° or –90°, a phase setting that the output S25 of the phase difference detection circuit 25 becomes zero may be searched. When the phase difference is 45°, for example, a phase setting in which the output S25 of the phase difference detection circuit 25 has a value of multiplying $1/\sqrt{2}$ with respect to the peak value of the output of the phase difference detection circuit 25 (that is, the voltage value near the phase difference of 0°) may be searched. However, for example, when searching for a phase setting of a phase difference of 0°, since the change in the output of the phase difference detection circuit 25 with respect to the phase change in the vicinity of the phase difference of 0° is extremely small, it is difficult to accurately search for the phase setting of a phase difference of 0°.

Figure 6:
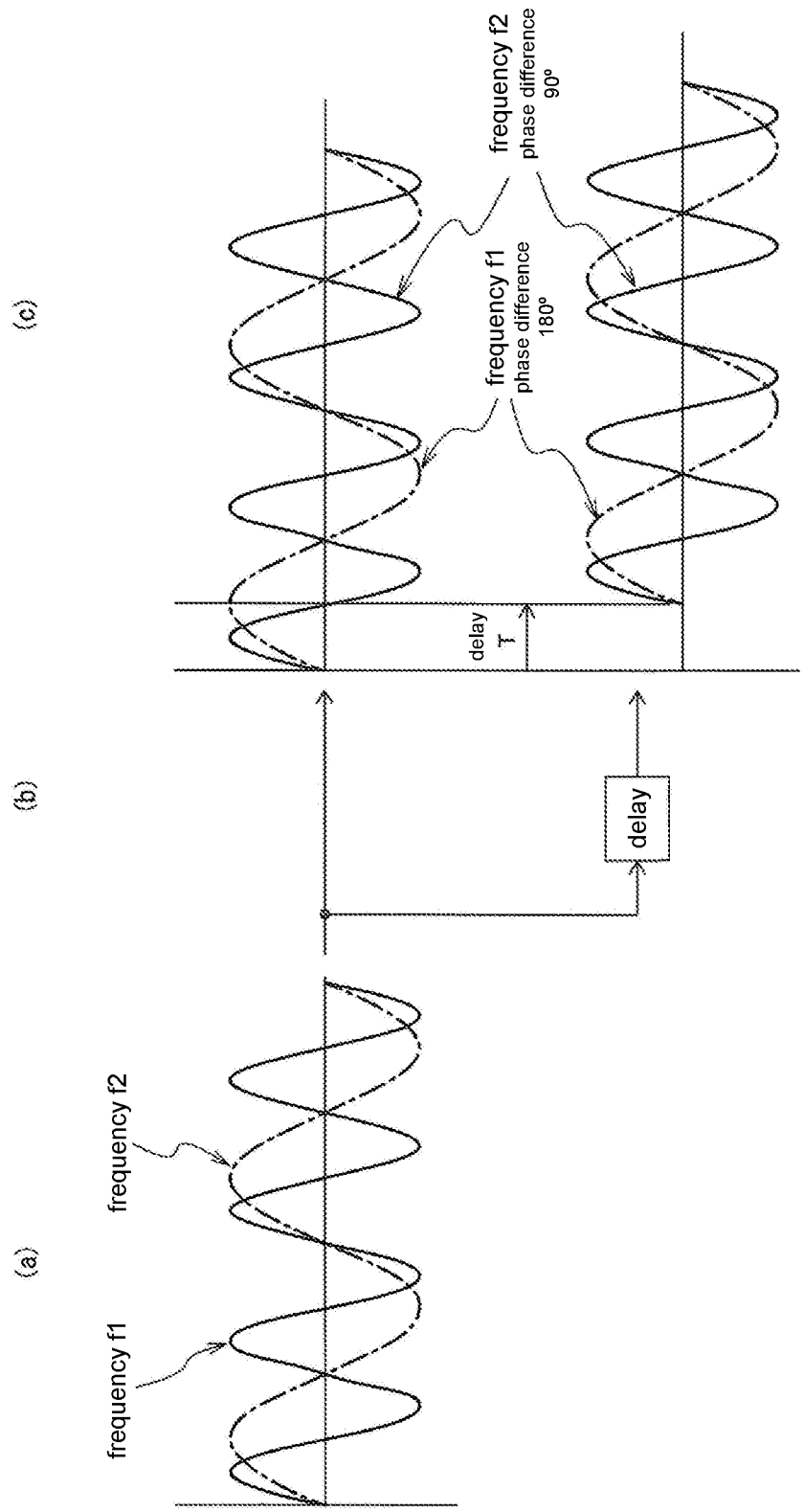
FIG. 6 is a diagram for explaining characteristics of a delay circuit.

Here, the characteristics of the delay circuit 22 shown in FIG. 6 are utilized. FIG. 6 is a diagram for describing the effects of the phase change due to the delay circuit 22. As shown in (a) of FIG. 6, a signal having a certain frequency f1 and a signal having a frequency f2 that is half the frequency f1 are used for the illustration. As shown (b) and (c) of FIG. 6, for a signal which has the frequency f1 delayed by T (T=1/(2×f1) in the example of FIG. 6) by the delay circuit 22, there is a relationship of the phase difference 180° as compared with the signal without being delayed. On the other hand, for the signal of the frequency f2, there is a phase difference of 90° between the delayed signal and the non-delayed signal. A time for that the local signal generated by the signal generation circuit 3 reaches the phase difference detection circuit 25 as a distribution signal via the delay circuit 22 etc. and a time for that the local signal reaches the phase difference detection circuit 25 as the reference signal are different by 200 ps for example due to the delay process by the delay circuit 22 or the like. At this time, assuming that the frequency of the local signal generated by the signal generation circuit 3 is 80 GHz and the period of the local signal is 12.5 ps, the time relationship between the distribution signal and the reference signal is that the distribution signal arrives late just by 16 cycles of period of the local signal. In other words, although the arrival time is delayed, there is a relation of 0° as the stationary phase difference between the signals.

Next, the frequency of the local signal generated by the signal generation circuit 3 is changed to 79 GHz.

Then, the arrival time difference between the two signals remains 200 ps, but the period of the local signal changes to 12.66 ps, so that the time relationship between the distribution signal and the reference signal is that the distribution signal arrived late by 15.8 cycles of period of the local signal. In other words, the stationary phase difference between signals is 288°, that is, –72°.

In this way, if there is a fixed time delay difference, even though in the situation where the phase setting of the phase shifter 21 is not changed at all, by changing the frequency of the local signal generated by the signal generation circuit 3, the phase difference between the distribution signal and the reference signal that reach the phase difference detection circuit 25 changes. By utilizing this characteristic, the phase detection is performed while avoiding the vicinity of extreme values where the sensitivity is deteriorated.

In general, the frequency range in which the frequency of the signal generated by the signal generation circuit 3 can be changed is limited. Therefore, in order to change the phase by a required amount by changing a small frequency, the delay amount (delay time) T has to be set to a sufficiently large value with respect to the period of the signal to be used, that is, the signal of a delay target. For example, the frequency of the signal of the delay target can be changed from 80 GHz (signal period: 12.5 ps) to 81 GHz (signal period: 12.3 ps). At the time, in a case that it requires to change the phase by 90° or more, the required delay amount T is 250 ps or more, and about 20 times or more of the signal period of the signal of the delay target is required.

Figure 7:
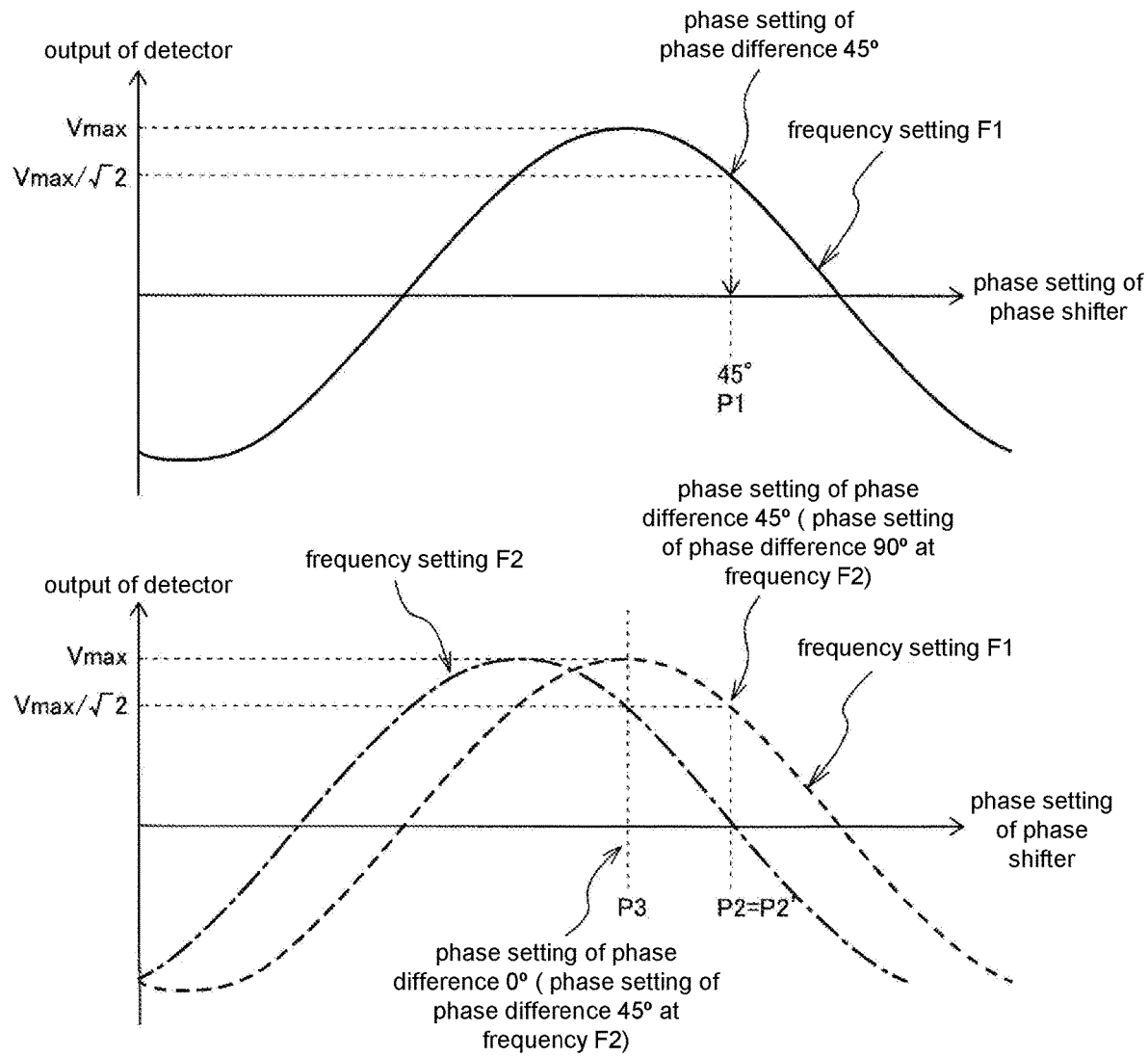
FIG. 7 is an explanatory diagram illustrating a method of setting a phase amount of a phase shifter.

For example, a case where it is desired to control the phase state so that the phase difference is 0° will be described with reference to FIG. 7.

First, in the local signal of frequency F1 generated by the signal generation circuit 3, phase setting for a phase difference of 45° (first phase reference value), that is, a phase amount that a phase should be shifted by the phase shifter 21 is searched (first phase adjusting signal generation circuit, the first step). This phase setting can be detected by searching for a point P1 indicating a value (Vmax/$\sqrt{2}$) that is obtained by multiplying 1/$\sqrt{2}$ by the maximum output value Vmax of the phase difference detection circuit 25.

Next, the frequency of the local signal generated by the signal generation circuit 3 is changed, and in the state where the phase amount of the phase shifter 21 is the phase setting P1 that indicates the phase difference of 45° advanced, the frequency F2 is searched for so that the output of the phase difference detection circuit 25 becomes zero (frequency adjusting signal generation circuit, the second step). That is, the frequency of the local signal generated by the signal generation circuit 3 is changed.

The phase setting P2 at which the output of the phase difference detection circuit 25 becomes zero is a phase setting that realizes a phase difference of 45° at the frequency F1, and is also the phase setting P2' that realizes the phase difference of 90° at the frequency F2.

Next, at the frequency F2, a phase setting P3 that can have a phase difference of 45° (second phase reference value) is searched for (second phase adjusting signal generation unit, third step). This phase setting P3 is nothing but the phase setting that results in a phase difference of 0° at the original frequency F1. Through this series of processes, the phase setting P3 that realizes the phase difference of 0° can be searched for at the frequency F1 without using the vicinity of the extreme value where the sensitivity deteriorates.

In this manner, it is possible to search for a phase setting in which the phase difference between the reference signal and the distribution signal can be all phase differences, and the phase difference between the N transmission outputs can be adjusted to an arbitrary relationship by performing similar processes on each of the N transmission circuits 2.

Here, the frequency F2 of the local signal is searched for as a "frequency at which the output of the phase difference detection circuit 25 indicates −1°", and next, by searching for a "phase setting that a phase difference can be 44° in the local signal of frequency F2", a phase setting that a phase difference can be 0° at the frequency F1 can be also searched for.

Further, although the phase setting that indicates the phase difference of 45° in the local signal of the frequency F1 is searched, it is not limited to 45° and may be 40°, for example. As described above, there are many possible procedures for searching for a phase setting that realizes an arbitrary phase difference. In short, by changing the frequency of the local signal generated by the signal generating circuit 3 to change the phase relationship between the distribution signal and the reference signal that reach the phase difference detecting circuit 25, the point is to search for a phase setting that realizes an arbitrary phase difference without using the vicinity of the extreme values of the output signal of the phase difference detection circuit 25.

When "In the local signal of the frequency F1, the phase difference of 45° when performing the phase setting that indicates the phase difference of 45°" is set as the first phase reference value and "In the frequency F2, the phase difference of 45° when performing the phase setting that indicates the phase difference of 45°" is set as the second phase reference value, the first phase reference value and the second phase reference value can be set in a manner that the sum of "the phase difference (that is, zero in this case) when searching for the frequency F2 at which the phase difference detected by the phase difference detection circuit 25 becomes zero from the state of being the first phase reference value (phase difference of 45°) at the frequency F1", "first phase reference value" and the "second phase reference value" is consistent with the target value (that is, zero in this case) of the phase difference between the local signal and the reference signal.

With this configuration, the phase setting that realizes an arbitrary phase difference can be searched for by the phase difference detection circuit 25 having a simple configuration. Further, since the signal generation circuit 3 that is essential to the disclosure is an essential circuit for a normal transmitter, there is no substantial increase in the circuit configuration. Furthermore, as for the delay circuit 22, delay may occur naturally by arranging the phase shifter 21, the amplifier 23 and the like necessary for the normal transmission circuit 2, and thus there is substantially no increase in circuits. Further, since the number of circuits is not increased significantly, the disclosure can be realized with a simple circuit configuration.

Then, when the search for the phase setting that realizes an arbitrary phase difference is completed in this way, the searched phase setting is set as the phase setting of the phase shifter 21 (the fourth step). Further, the frequency of the signal generation circuit 3 is returned to the frequency as the transmission carrier. As a result, the signal generation circuit 3 generates the local signal having a predetermined frequency according to the transmission data from the adjusting signal generation circuit 4, and the phase shifter 21 shifts the phase of the local signal according to the set phase setting. Therefore, a transmission signal having a frequency corresponding to the transmission data is generated, and a transmission signal having a predetermined phase difference with respect to the reference signal, that is, the local signal is generated.

Then, in the same procedure, in each transmission circuit 2, the phase amount of the phase shifter 21 is adjusted by setting the phase setting searched for as the phase shifter 21, so that the reference signal and the local signal have a predetermined phase difference in each transmitting circuit 2. As a result, the phase difference between the transmission signals of the transmission circuits 2 is controlled to be the target value, and the transmission made by beamforming is performed.

In addition, as described above, in the phase difference detection circuit 25, the phase difference can be adjusted more accurately, and the phase adjustment of each transmission circuit 2 can be performed with higher accuracy by determining the phase control amount of the phase shifter 21 according to the detection signal of the phase difference detection circuit 25. Then, the adjustment can be performed more accurately in a manner that the distribution signal and the reference signal in each transmission circuit 2, that is, the local signal generated by the same signal generation circuit 3 and the distributed signal have a predetermined phase difference, and therefore, the accuracy of the transmitter 1 that uses the beamforming can be improved.

Further, since the signal generation circuit 3 which is necessary for the above-mentioned phase adjustment is an essential component for a normal transmitter, there is no substantial increase in the circuit.

Therefore, for example, at start-up, at a predetermined cycle, or when a longitudinal inclination angle of the vehicle chassis changes in the case of the transmitter 1 installed in the vehicle, the phase amount of the phase shifter 21 is adjusted by changing the phase amount of the phase shifter 21 and the frequency of the signal generation circuit 3 in a manner that the phase difference between the transmission signals of each transmission circuit 2 becomes the target value. Then, when the phase amount that can be the predetermined phase difference is acquired, the frequency of the signal generation circuit 3 is returned to the original frequency, and the phase of the local signal is shifted by the phase amount newly set to the phase shifter 21 to perform wireless transmission. As a result, the beamforming of which the phase difference is adjusted with higher accuracy can be performed.

Modification of First Embodiment

Figure 8:
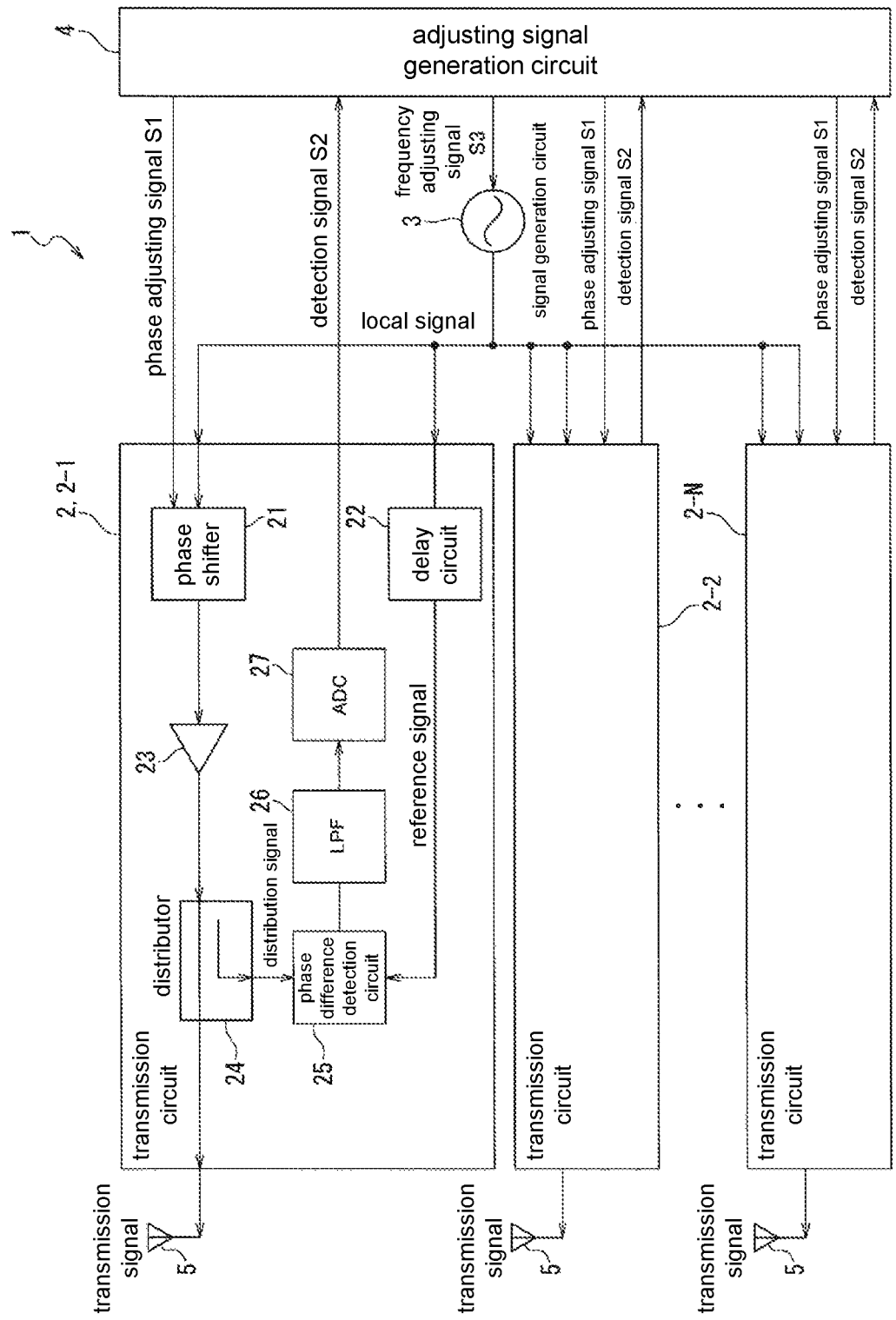
FIG. 8 is a modification of the transmitter according to the first embodiment.

FIG. 8 shows a modification of the phase adjusting circuit applied to the transmitter 1 according to the first embodiment.

In the transmitter 1 according to the first embodiment, as shown in FIG. 1, although the delay circuit 22 is inserted between the signal generation circuit 3 and the distributor 24 to delay the distribution signal arriving at the phase difference detection circuit 25, but as shown in FIG. 8, a difference may be set in the arrival time of the distribution signal and the reference signal by inserting the delay circuit 22 in the path where the local signal from the signal generation circuit 3 is used as the reference signal and is then received by the phase difference detection circuit 25. Even though in this case, the same effects as that of the first embodiment can be obtained. In this case, for example, the delay amount of the delay circuit 22 is adjusted by cascading buffer circuits having a known passing delay with the required number of stages, so that the delay amount of the delay circuit 22 is larger than the total value of the delay amounts of the phase shifter 21 and the amplifier 23 by an amount that can realize the above-mentioned phase change amount within the settable frequency change range. Alternatively, for example, the delay amount may be set by utilizing the delay caused by the wiring length and adjusting the connection wiring length.

Figure 9:
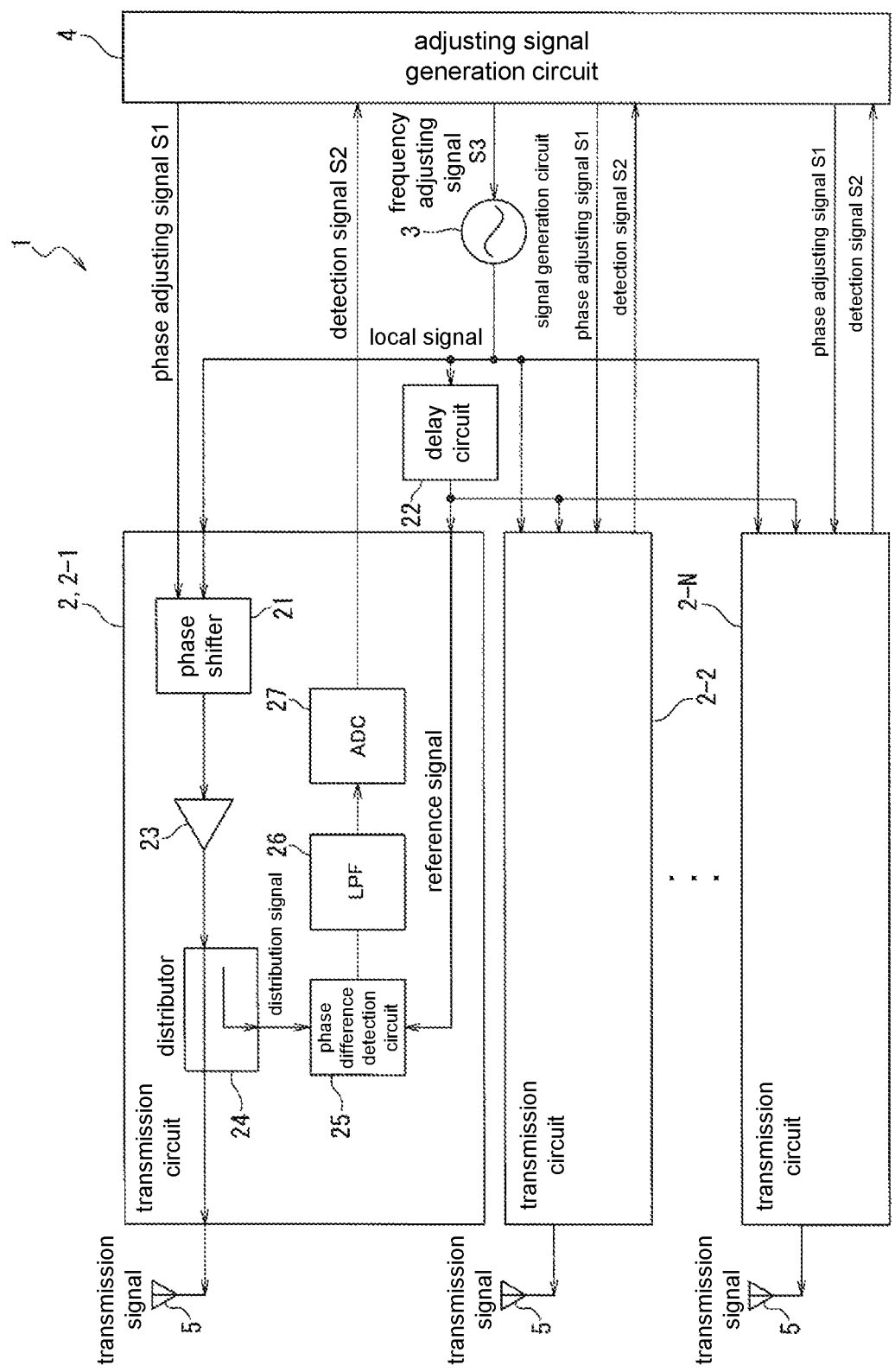
FIG. 9 is a modification of the transmitter according to the first embodiment.

Further, the delay circuit 22 is not limited to being provided for each transmission circuit 2. As shown in FIG. 9, one delay circuit 22 can be provided between the transmission circuit 2 and the signal generation circuit 3, so that after delaying the local signal generated by the signal generation circuit 3 by the delay circuit 22, the delayed local signal can be provided to each transmission circuit 2 as the reference signal. Similarly, when the delay circuit 22 is provided on the input side of the phase shifter 21, a common delay circuit 22 is provided and the local signal delayed by the delay circuit 22 is distributed to each transmission circuit 2 as a local signal. As described above, by providing one delay circuit 22 common to each transmission circuit 2 instead of providing the delay circuit 22 for each transmission circuit 2, miniaturization and cost reduction for the transmitter 1 can be are achieved.

Second Embodiment

Next, a second embodiment of the present disclosure will be described.

The transmitter 1 according to the second embodiment uses the phase difference detection circuit 25-1 utilizing the distortion characteristic described in Patent Document 1 as a phase difference detection circuit forming a phase adjusting circuit.

Figure 10:
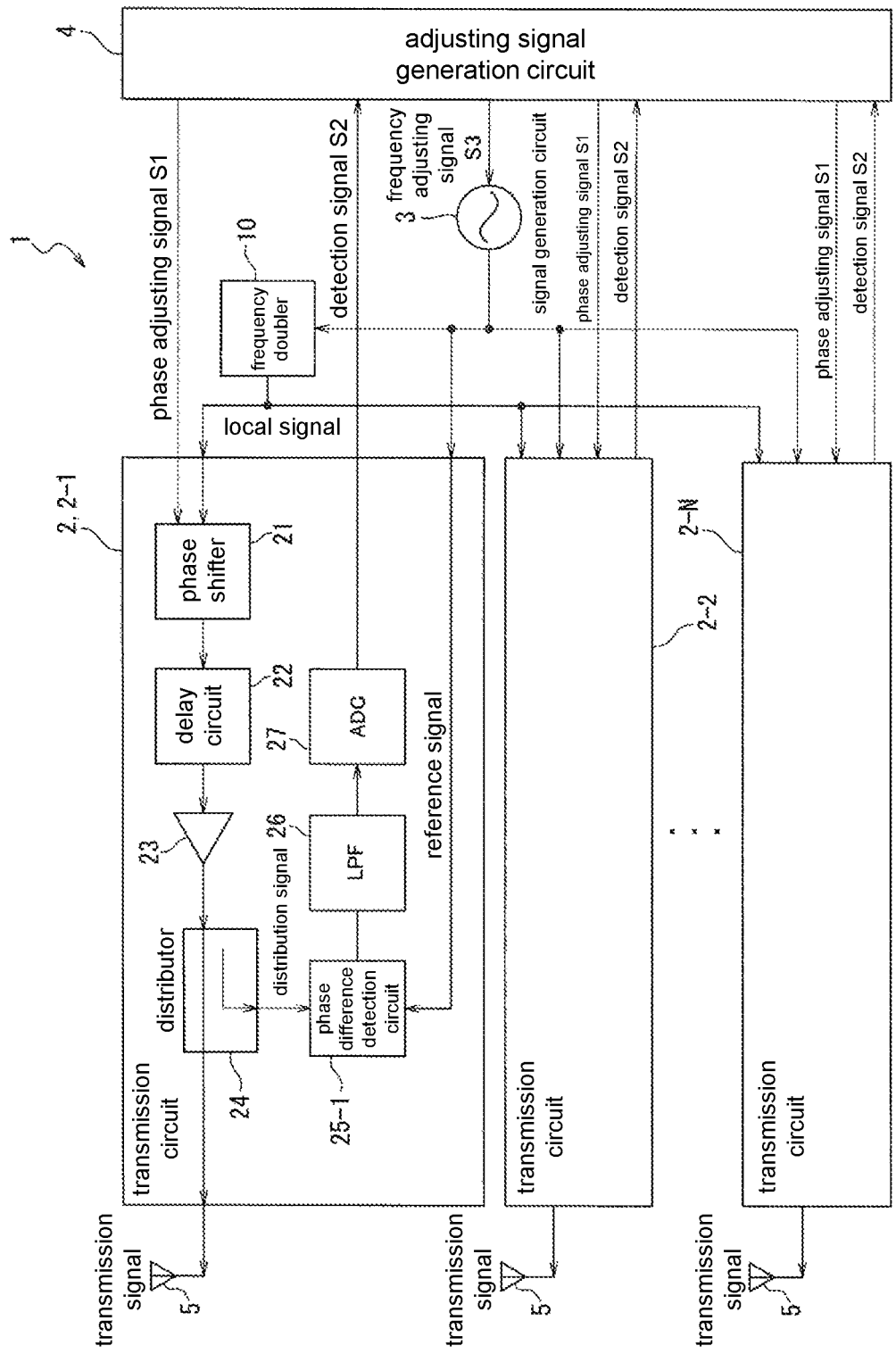
FIG. 10 is a schematic configuration showing an example of a transmitter to which a phase adjusting circuit according to a second embodiment is applied.

That is, as shown in FIG. 10, the transmitter 1 according to the second embodiment comprises a phase difference detection circuit 25-1 that utilizes the distortion characteristics as the phase difference detection circuit in each transmission circuit 2. Furthermore, the phase adjusting circuit that forms the transmitter 1 comprises a frequency doubler 10 that doubles the frequency of the local signal generated by the signal generation circuit 3.

The local signal generated by the signal generation circuit 3 is provided as the reference signal to each transmission circuit 2 and to the frequency doubler 10. The frequency doubler 10 receives the signal generated by the signal generation circuit 3, doubles the frequency of the received signal, and generates the signal of which the frequency is doubled as a local signal to each transmission circuit 2.

Figure 11:
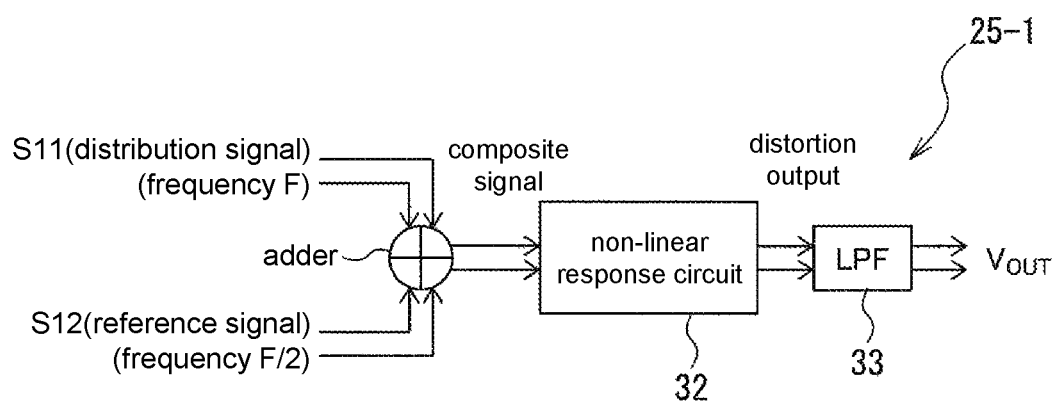
FIG. 11 is a schematic configuration diagram showing an example of a phase difference detection circuit.

FIG. 11 is a schematic configuration diagram showing an example of the phase difference detection circuit 25-1.

The phase difference detection circuit 25-1 comprises an adder 31 for adding the reference signal and a distribution signal having a frequency doubled by the frequency doubler 10, a non-linear response circuit 32 having an odd-order (generally third-order) non-linear input/output response, and an LPF 33 for performing low-pass filtering on the signal provided from the non-linear response circuit 32.

Figure 12:
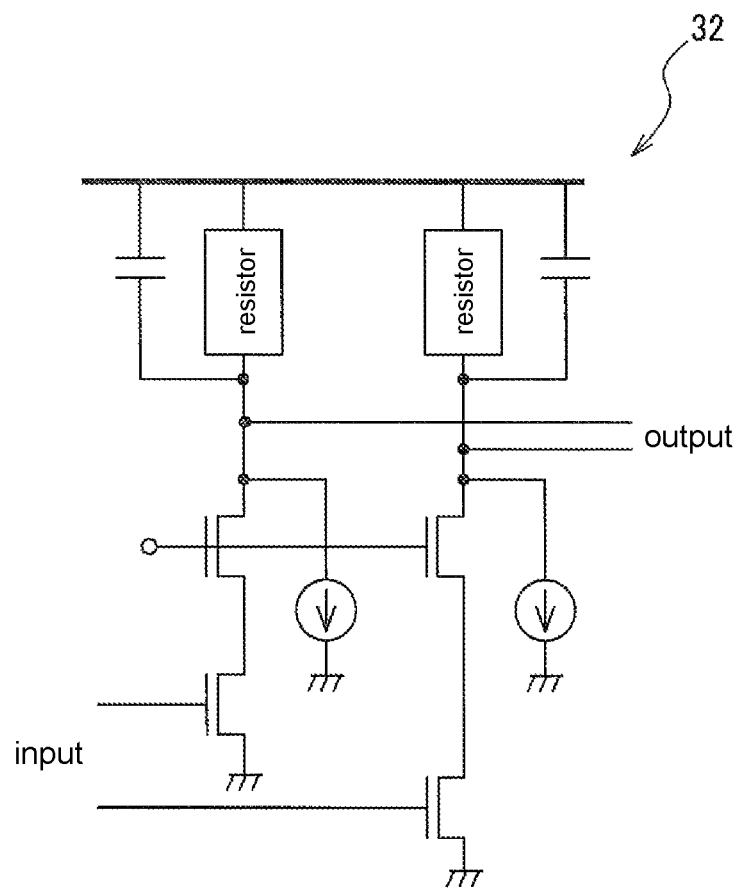
FIG. 12 is a schematic configuration diagram showing an example of a non-linear response circuit.

As shown in FIG. 12, for example, the non-linear response circuit 32 has a configuration in which an input signal is amplified by an amplifier having a differential configuration, and the non-linearity of the transistor itself directly affects the output signal. In addition, the non-linearity of even-order (generally quadratic) is eliminated by the amplifier having the differential configuration. In the phase difference detection circuit 25-1 shown in FIG. 11, the composite signal of which two signals having different frequencies are added by the adder 31 is provided to the nonlinear response circuit 32 having the third-order nonlinearity shown in FIG. 12, a signal having third-order distortion is presented in the distortion output which is the output of the non-linear response circuit 32.

Here, when the frequency of the input signal S11 and the frequency of the input signal S12 have a relationship of F: F/2, the generated third-order distortions are two respectively at a frequency of 0 (that is, direct current) and a frequency of 3F/2. the component of frequency 0 is a DC voltage proportional to sin θ with respect to the phase difference θ between the input signal S11 and the input signal S12. That is, it functions as a phase difference detection circuit.

Therefore, in order that the phase difference detection circuit 25-1 functions as the phase difference detection circuit, the relationship between the frequency of the input signal S11 (reference signal) and the frequency of the input signal S12 (distribution signal) has to be 1:2. Therefore, as shown in FIG. 10, the signal generated by the signal generation circuit 3 is converted by the frequency doubler 10 into a signal having a doubled frequency, and the signal having a frequency twice that of the reference signal is provided to each transmission circuit 2 as the local signal.

The relationship between the frequency of the reference signal and the frequency of the distributed signal should be a relationship of 2:1, and thus a configuration using a frequency half divider instead of the frequency doubler 10 may be used.

Figure 13:
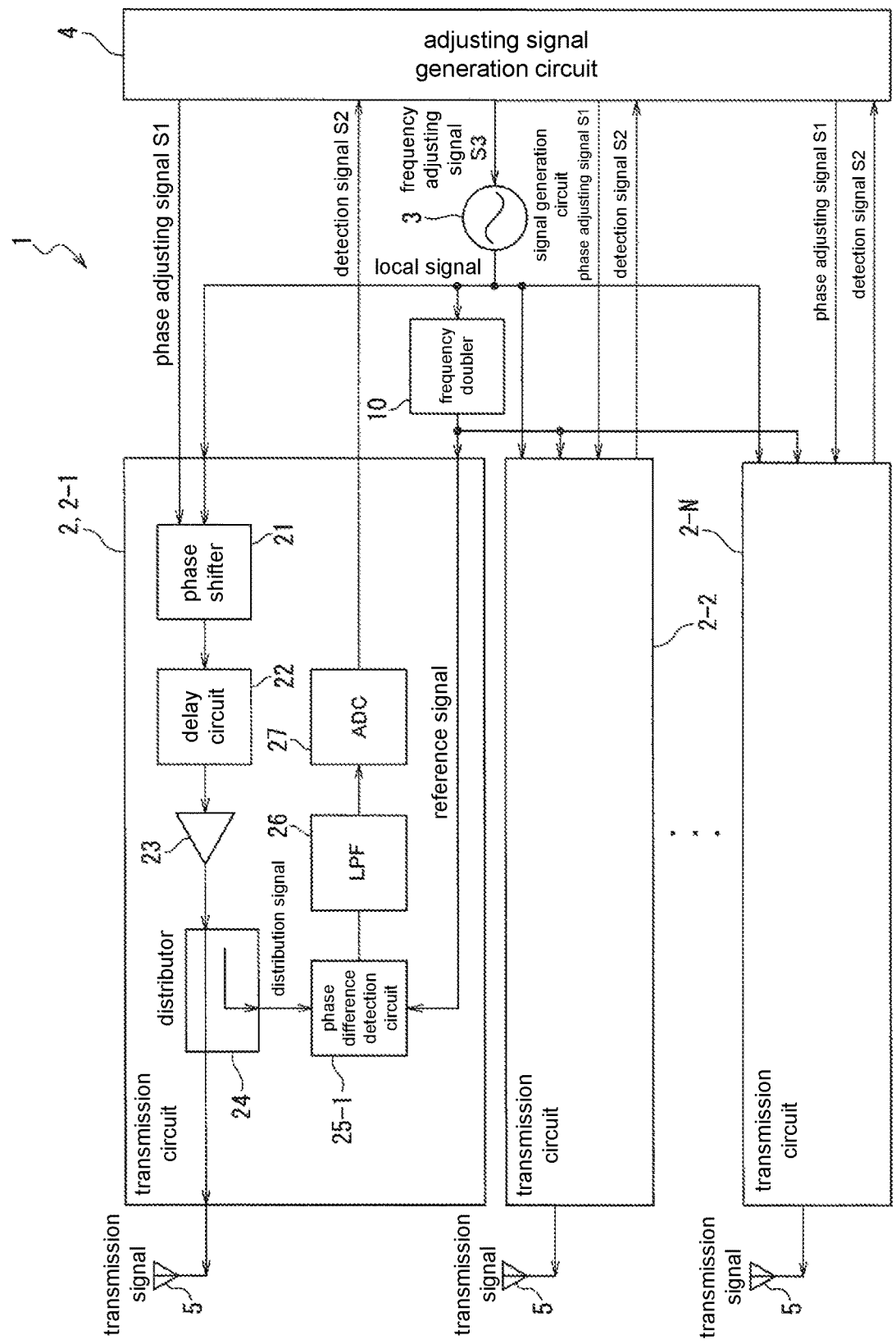
FIG. 13 is a modification of the transmitter according to the second embodiment.

Also, as shown in FIG. 13, in order to generate a signal that has twice the frequency of the local signal as the reference signal, the frequency doubler 10 may be provided, or the frequency half divider may be used to generate a signal having a frequency half of the local signal as the reference signal.

As described above, even when the phase difference detection circuit 25-1 utilizing the distortion characteristic is used as the phase difference detection circuit, the same effects as the first embodiment can be obtained.

Third Embodiment

Next, a third embodiment of the present disclosure will be described.

Figure 14:
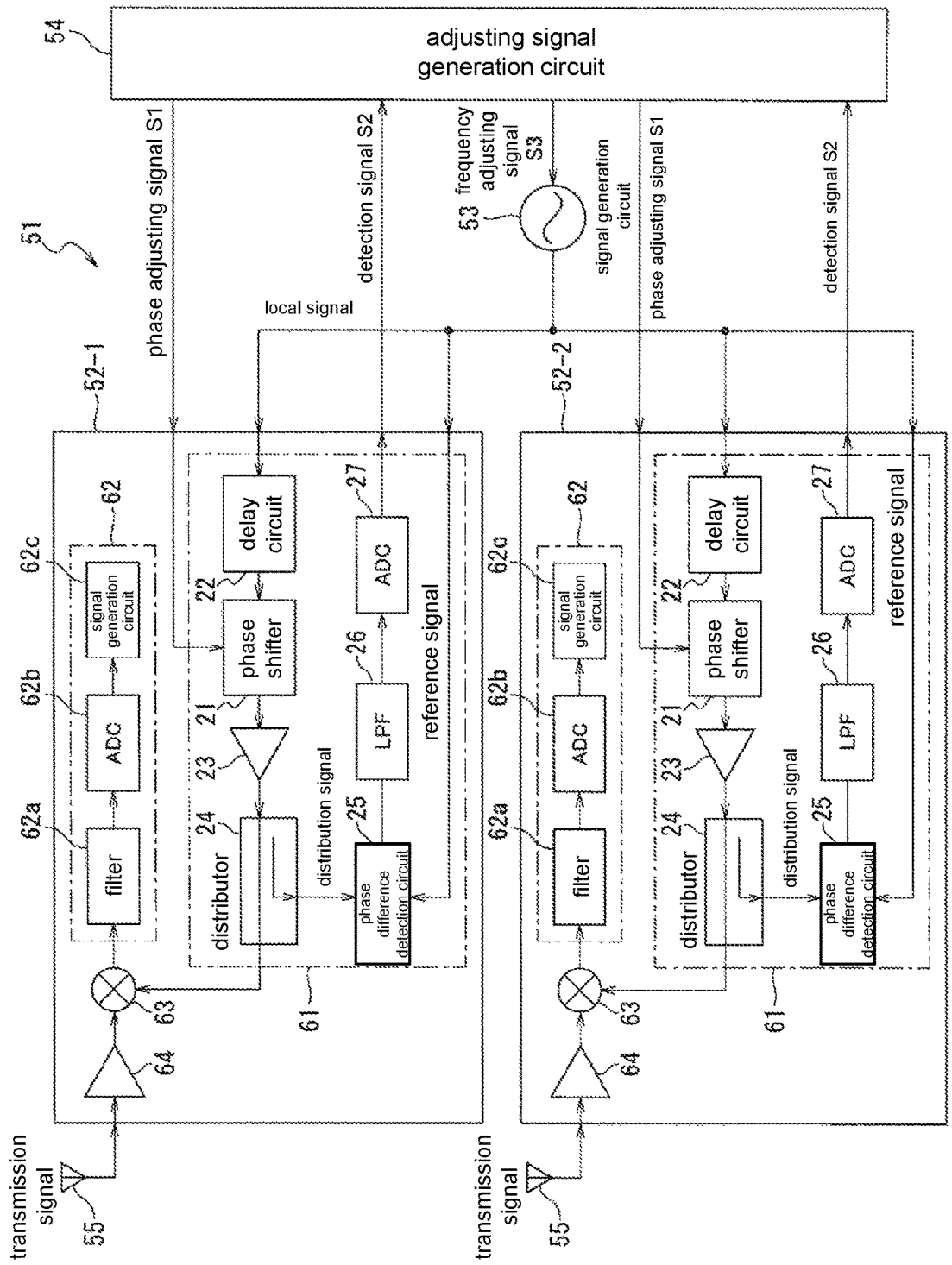
FIG. 14 is a schematic configuration showing an example in which a phase adjustment circuit according to the present disclosure is applied to a receiver.
Figure 15:
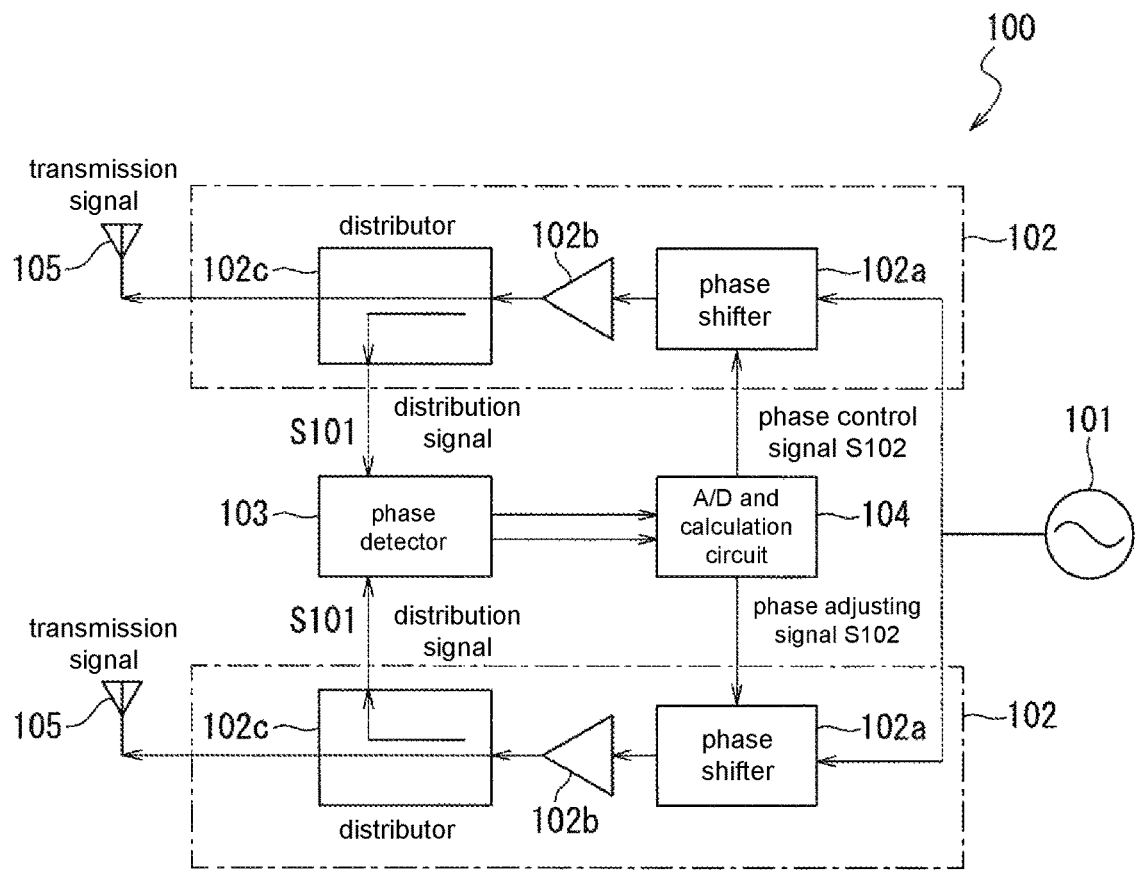
FIG. 15 is a configuration diagram showing an example of a transmitter to which a conventional phase adjusting circuit is applied.
Figure 16:
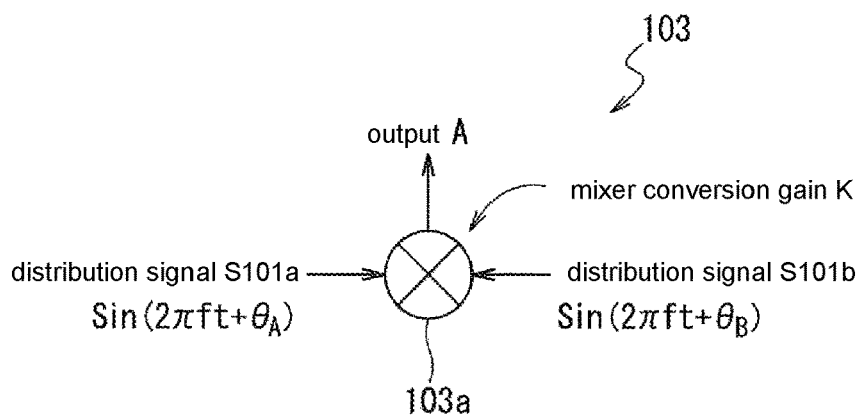
FIG. 16 is a configuration diagram showing an example of a conventional phase difference detection circuit.
Figure 17:
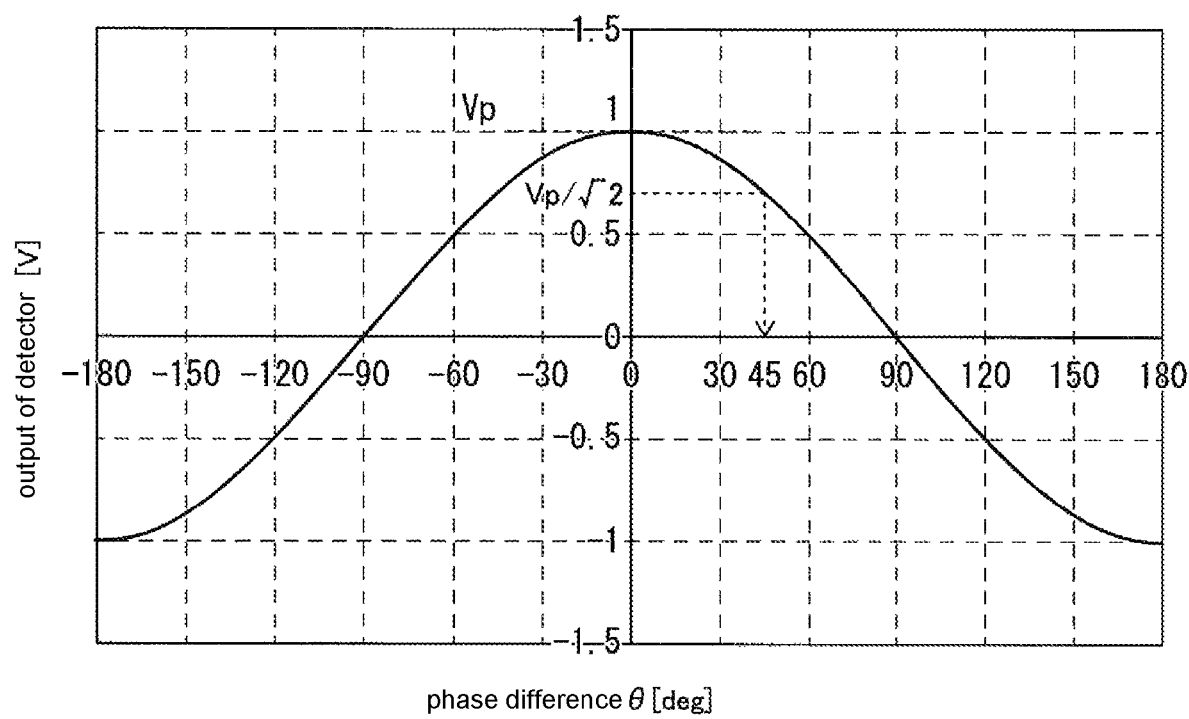
FIG. 17 is an example of a characteristic diagram showing the relationship between the phase difference θ between two distribution signals and the output of the mixer circuit.
Figure 18:
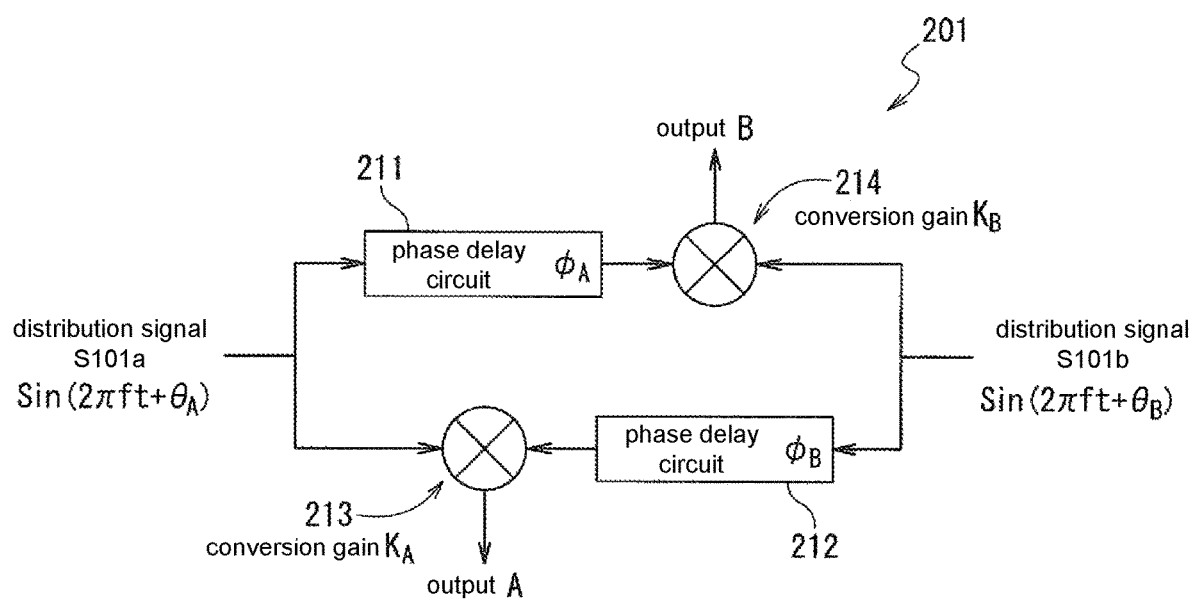
FIG. 18 is a configuration diagram showing another example of a conventional phase difference detection circuit.
Figure 19:
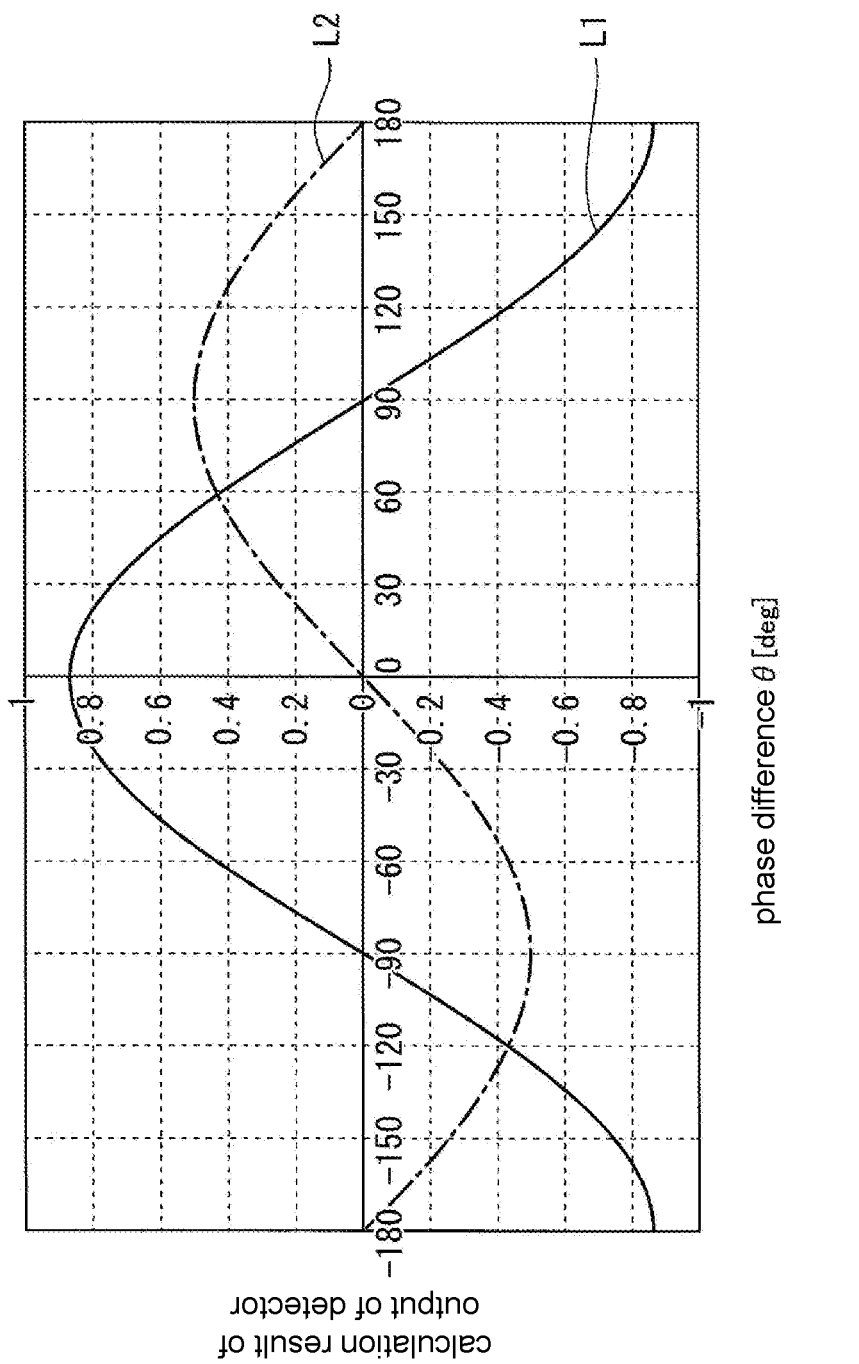
FIG. 19 is a characteristic diagram showing characteristics of a conventional phase difference detection circuit.

In the third embodiment, the phase adjusting circuit according to the present disclosure is applied to a receiver 51, and FIG. 14 shows a schematic configuration of the receiver 51.

The receiver 51 comprises N (N=2 in FIG. 14) reception circuits 52 (52-1, 52-2, . . . , 52-N, N is a positive integer), one signal generation circuit 53, and an adjusting signal generation circuit 54 that calculates the phase amount in each reception circuit 52 and controls the frequency of the signal generation circuit 53. The signal generation circuit 53 is configured to be able to adjust frequency, and changes the frequency of the generated signal so that the frequency becomes a frequency specified according to the frequency adjusting signal from the adjusting signal generation circuit 54. That is, the signal generation circuit 53 is a signal generation circuit which receives the frequency adjusting signal and generates a reference signal having a frequency corresponding to the frequency adjusting signal.

The reception circuit 52 comprises a phase adjusting unit 61 and a demodulation unit 62. After the reception signal received by the antenna 55 is amplified by an LNA (low noise amplifier) 64, the mixer circuit 63 multiplies the amplified signal with the local signal provided from the phase adjusting unit 61, and the multiplication result is demodulated by the demodulation unit 62.

The phase adjusting unit 61 has the same functional configuration as the transmission circuit 2 of the transmitter 1 according to the first embodiment. In the phase adjusting unit 61, the same parts as those of the transmission circuit 2 are designated by the same reference numerals. That is, in the phase adjusting unit 61, the signal generated by the signal generation circuit 53 is delayed by the delay circuit 22 by a predetermined amount, and then the phase shifter 21 shifts the phase by a predetermined amount. After being amplified by the amplifier 23, the amplified signal is provided to the mixer circuit 63 via the distributor 24 as a local signal, and is also provided to the phase difference detection circuit 25 via the distributor 24 as a distribution signal. The phase difference detection circuit 25 receives the signal generated by the signal generation circuit 53 as a reference signal, and provides a signal indicating the phase difference between the reference signal and the distribution signal to the adjusting signal generation circuit 54 as a detection signal via the ADC 27.

The filter unit 62a of the demodulation unit 62 performs a filtering process on the filter the multiplication result obtained by multiplying the local signal and the reception signal by the mixer circuit 13 and the filtered signal is changed to an analog signal by the ADC 62b to obtain a demodulated signal, and then the signal processing unit 62c performs predetermined signal processing on the reception signal.

In each receiving circuit 52 in the same procedure, by setting the searched phase setting as the phase amount of the phase shifter 21, the delay amount of the delay circuit 22 is adjusted so that the reference signal and the local signal in each reception circuit 52 have a predetermined phase difference. Therefore, also in this case, since each reception circuit 52 can be adjusted in a manner that the distribution signal and the reference signal in each reception circuit 52 have a predetermined phase difference, the accuracy of the receiver 51 using the beamforming can be increased.

In the above embodiment, the case where the phase state is controlled to have a phase difference of 0° has been described, but the phase state can be controlled to an arbitrary phase state. At this time, when the target value of the phase difference is an extreme value or its nearby values such as 0°, 180°, or −180°, the phase difference can be adjusted with high accuracy by changing the phase adjusting signal and the frequency adjusting signal to set the phase amount of the phase shifter 21 with the above-mentioned processes. On the other hand, when the target value of the phase difference is not an extreme value such as 45° or 90° and the phase difference between the distribution signal and the reference signal can be detected by the phase difference detection circuit 25 with a relatively high accuracy, instead of the above method of changing the phase adjusting signal and the frequency adjusting signal, it may calculate a phase amount that can suppress the phase difference between the distribution signal and the reference signal based on the obtained phase difference, and then set the calculated phase amount as the phase amount of the phase shifter 21.

Further, in the above embodiment, the case that the disclosure is applied to the transmitter 1 or the receiver 51 using the beamforming has been described, but the present disclosure is not limited thereto. Any phase adjusting circuit, which can adjusts the phase amount of the phase shifter 21 so that the phase difference between the two signals becomes the target value based on the phase difference detection value of the phase difference detection circuit 25, can be applied.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A phase adjusting circuit, comprising:
a signal generation circuit that receives a frequency adjusting signal and generates a reference signal having a frequency corresponding to the frequency adjusting signal;
a first path that receives the reference signal and provides a first signal;
a second path that receives the reference signal and provides a second signal, and a time for the reference signal passing through the second path is different from a time for the reference signal passing through the first path;
a phase shifter that is disposed on either one of the first path and the second path and shifts a phase of the reference signal based on a phase adjusting signal;
a phase difference detection circuit for detecting a phase difference between the first signal and the second signal; and
an adjusting signal generation circuit that generates the frequency adjusting signal and the phase adjusting signal based on the phase difference so that the phase difference becomes a target value.

2. The phase adjusting circuit according to claim 1, wherein the phase difference detection circuit provides a signal represented by $\sin\theta$ or $\cos\theta$, where $\theta$ is the phase difference between the first signal and the second signal.

3. The phase adjusting circuit according to claim 1, further comprising a delay circuit that is provided on at least one of the first path and the second path.

4. The phase adjusting circuit according to claim 1, further comprising:
- a plurality of phase adjusting units each comprising the phase shifter and the phase difference detection circuit,
- wherein the delay circuit is provided between the signal generation circuit and the plurality of phase adjusting units, and
- an output of the delay circuit passes through each of the plurality of first paths provided with each of the plurality of phase shifters and is provided to the plurality of phase shifters, or
- passes through each of the plurality of second paths and is provided to the plurality of phase difference detection circuits.

5. The phase adjusting circuit according to claim 1, further comprising a frequency doubler that is provided on at least one of the first path and the second path.

6. The phase adjusting circuit according to claim 1, further comprising:
- a plurality of phase adjustment units each including the phase shifter and the phase difference detector; and
- a frequency doubler that is provided between the signal generation circuit and the plurality of phase adjustment units,
- wherein an output of the frequency doubler passes through each of the plurality of first paths provided with each of the plurality of phase shifters and is provided to the plurality of phase shifters, or
- passes through each of the plurality of second paths and is provided to the plurality of phase difference detection circuits.

7. The adjusting signal generation circuit according to claim 1, further comprising:
- a first phase adjusting signal generation circuit that changes the phase adjusting signal so that the phase difference is consistent with a first phase reference value different from the target value;
- a frequency adjusting signal generation circuit, wherein when the phase difference is consistent with the first phase reference value, a signal value of the phase adjusting signal is unchanged, and the frequency adjusting signal is generated that changes the frequency of the reference signal to a frequency different from a frequency at a time when the phase difference and the first phase reference value are consistent; and
- a second phase adjusting signal generation circuit that changes the phase adjusting signal in a manner that an updated frequency after changing the frequency is unchanged, and the phase difference is consistent with a second phase reference value,
- wherein the second phase reference value is set in a manner that a sum of the phase difference when the frequency of the reference signal is changed to the update frequency, the first phase reference value and the second phase reference value is consistent with the target value.

8. The adjusting signal generation circuit according to claim 4, further comprising:
- a first phase adjusting signal generation circuit that changes the phase adjusting signal so that the phase difference is consistent with a first phase reference value different from the target value;
- a frequency adjusting signal generation circuit, wherein when the phase difference is consistent with the first phase reference value, a signal value of the phase adjusting signal is unchanged, and the frequency adjusting signal is generated that changes the frequency of the reference signal to a frequency different from a frequency at a time when the phase difference and the first phase reference value are consistent; and
- a second phase adjusting signal generation circuit that changes the phase adjusting signal in a manner that an updated frequency after changing the frequency is unchanged, and the phase difference is consistent with a second phase reference value,
- wherein the second phase reference value is set in a manner that a sum of the phase difference when the frequency of the reference signal is changed to the update frequency, the first phase reference value and the second phase reference value is consistent with the target value.

9. The adjusting signal generation circuit according to claim 6, further comprising:
- a first phase adjusting signal generation circuit that changes the phase adjusting signal so that the phase difference is consistent with a first phase reference value different from the target value;
- a frequency adjusting signal generation circuit, wherein when the phase difference is consistent with the first phase reference value, a signal value of the phase adjusting signal is unchanged, and the frequency adjusting signal is generated that changes the frequency of the reference signal to a frequency different from a frequency at a time when the phase difference and the first phase reference value are consistent; and
- a second phase adjusting signal generation circuit that changes the phase adjusting signal in a manner that an updated frequency after changing the frequency is unchanged, and the phase difference is consistent with a second phase reference value,
- wherein the second phase reference value is set in a manner that a sum of the phase difference when the frequency of the reference signal is changed to the update frequency, the first phase reference value and the second phase reference value is consistent with the target value.

10. The phase adjusting circuit according to claim 7, wherein the first phase reference value and the second phase reference value are respectively set to values excluding a phase difference where the phase difference detection value is an extreme value.

11. The phase adjusting circuit according to claim 8, wherein the first phase reference value and the second phase reference value are respectively set to values excluding a phase difference where the phase difference detection value is an extreme value.

12. The phase adjusting circuit according to claim 9, wherein the first phase reference value and the second phase reference value are respectively set to values excluding a phase difference where the phase difference detection value is an extreme value.

* * * * *